United States Patent [19]
Atalar et al.

[11] Patent Number: 5,908,981
[45] Date of Patent: Jun. 1, 1999

[54] INTERDIGITAL DEFLECTION SENSOR FOR MICROCANTILEVERS

[75] Inventors: Abdullah Atalar, Ankara, Turkey; Scott R. Manalis, Santa Barbara, Calif.; Stephen C. Minne, Danville, Ill.; Calvin F. Quate, Stanford, Calif.

[73] Assignee: Board of Trustees of the Leland Stanford, Jr. University, Stanford, Calif.

[21] Appl. No.: 08/708,446

[22] Filed: Sep. 5, 1996

[51] Int. Cl.⁶ .............................. G01B 11/30; G01B 9/02; G01B 9/04
[52] U.S. Cl. .............................. 73/105; 356/354; 356/356
[58] Field of Search .................................. 356/354, 356; 250/306, 307; 73/105

[56] References Cited

U.S. PATENT DOCUMENTS

| | | | |
|---|---|---|---|
| 4,626,066 | 12/1986 | Levinson | 385/22 |
| 4,854,321 | 8/1989 | Buierkski | 600/312 |
| 5,144,833 | 9/1992 | Amer et al. | 73/105 |
| 5,221,415 | 6/1993 | Albraht et al. | 156/629 |
| 5,245,863 | 9/1993 | Kajimure et al. | 73/105 |
| 5,606,162 | 2/1997 | Buser et al. | 73/105 X |
| 5,627,365 | 5/1997 | Chiba et al. | 73/105 |
| 5,694,501 | 12/1997 | Alavie et al. | 385/37 |

OTHER PUBLICATIONS

"Dynamic Micromechanics On Silicon: Techniques and Devices", by Kurt E. Peterson, *IEEE Transactions On Electron Devices*, vol. ED–25, No. 10, Oct. 1978 (pp. 1241, 1243, 1245, 1247, and 1249).

"Polycrystalline Silicon Micromechanical Beams", by R. T. Howe and R. S. Muller, *J. Electrochem. Soc.: Solid–State Science And Technology*, Jun. 1983 (pp. 1420 to 1423).

"Atomic–Scale Friction Of A Tungsten Tip On A Graphite Surface", by C. Mathew Mate, et al., *Physical Review Letters*, vol. 59, No. 17, Oct. 26, 1987 (pp. 1942 to 1945).

"From Atoms To Integrated Circuit Chips, Blood Cells, And Bacterial With Atomic Force Microscope", by S.A.C. Gould, et al., *J. Vac. Sci. Technol.A8(1)* Jan./Feb. 1990 (pp. 369 to 373).

"Deformable Grating Optical Modulator", by O. Solgaard, et al., *Optics Letters*, vol. 17, No. 9, May 1, 1992 (pp. 688 to 690).

"An Attractive New Way To Pin An ID on Atoms", by Robert F. Service, *Science*, vol. 264, Jun. 10, 1994 (p. 1532).

"First Images From A Magnetic Resonance Force Microscope" by O. Züger et al., *Appl. Phys. Lett.* 63(18), Nov. 1, 1993 (pp. 2496 to 2498).

"Observation Of A Chemical Reaction Using a Micromechanical Sensor", by J. K. Gimzewski et al., *Chemical Physics Letters*, vol. 217, No. 5,6, Jan. 28, 1994 (pp. 589 to 594).

"A New, Optical–Lever Based Atomic Force Microscope", by P.K. Hansma et al., *J. Appl. Phys.* 76(2), Jul. 15, 1994 (pp. 796 to 799).

(List continued on next page.)

*Primary Examiner*—Thomas P. Noland
*Attorney, Agent, or Firm*—Skjerven, Morrill, MacPherson, Franklin & Friel LLP; David E. Steuber

[57] ABSTRACT

A deflection sensor for a microcantilever includes two sets of interdigitated fingers, one (reference) set being attached to the substrate from which the microcantilever extends and the other (movable) set being attached to the tip of the microcantilever. Together the interdigitated fingers form an optical phase grating. The deflection of the microcantilever is measured by directing a light beam against the optical phase grating and detecting the intensity of the reflected light in the first (or other) component of the resulting diffraction pattern. As the microcantilever deflects, the reference and movable fingers move relative to one another creating large variations in the intensity of the zeroth and first order components of the diffraction pattern. To eliminate "1/f" noise the deflection of the microcantilever can be measured using an AC signal.

26 Claims, 24 Drawing Sheets

OTHER PUBLICATIONS

"UHV Cantilever Beam Technique For Quantitative Measurements Of Magnetization, Magnetostriction, And Intrinsic Stress Of Ultrathin Magnetic Films", by M. Weber et al., *Physical Review Letters,* vol. 73, No. 8, Aug. 22, 1994 (pp. 1166 to 1169).

"Photothermal Spectroscopy With Femtojoule Sensitivity Using A Micromechanical Device", by J. R. Barnes et al., Letters to Nature, *Nature,* vol. 372, Nov. 3, 1994 (pp. 79–81).

"Micromechanical Sensors For Chemical And Physical Measurements", by E. A. Wachter et al., *Rev. Sci. Instrum.* 66(6), Jun. 1995 (pp. 3662 to 3667).

"Surface–Micromachined Free–Space Micro–Optical Systems Containing Three–Dimensional Microgratings", by S. S. Lee et al., *Applied Physics Letters, Online,* 67, 2135 (1995), Jan. 1, 1996 (pp. 1 to 10).

*Patent Abstracts of Japan* (06–289036) Oct. 18, 1994 "Cantilever and Scanning Force Microscope" Hisao Osawa.

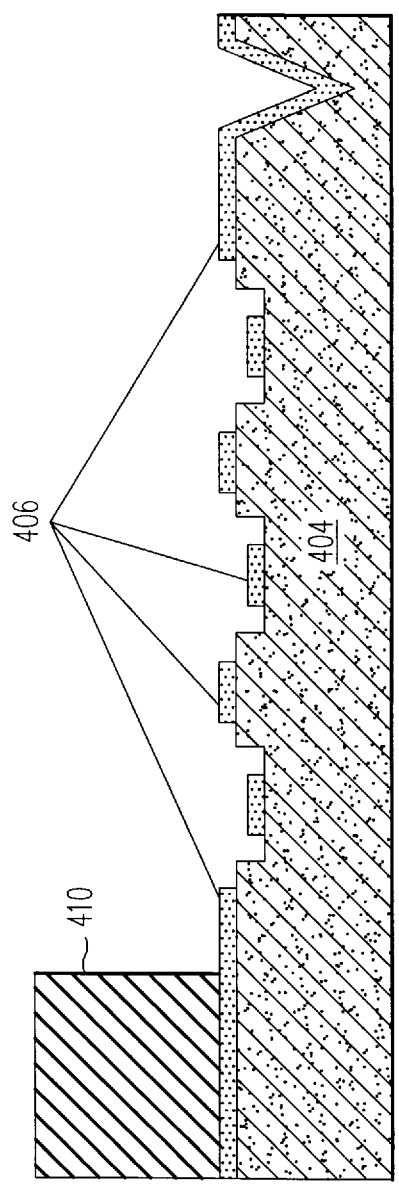
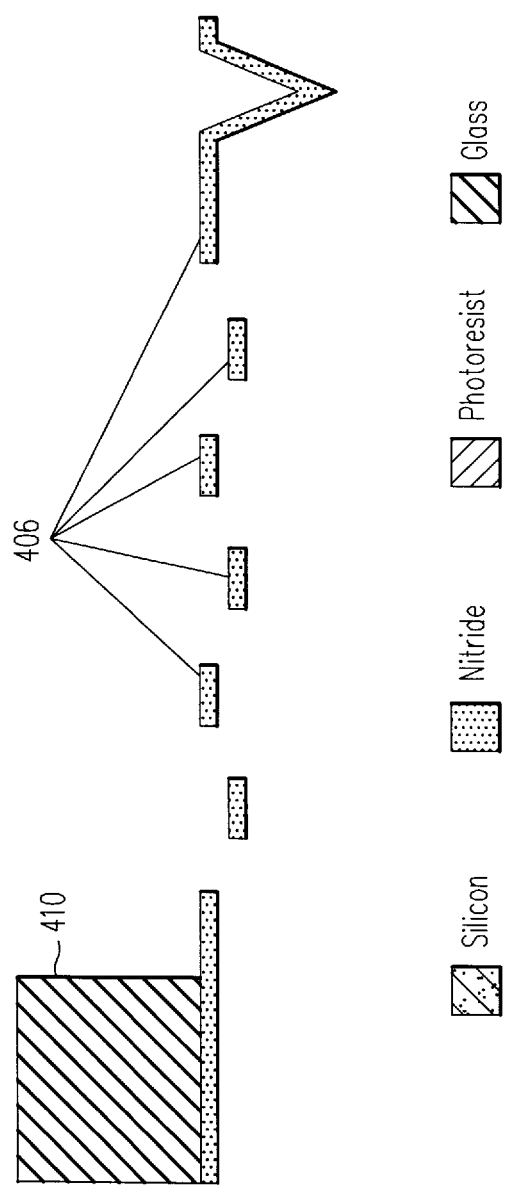

INTERDIGITAL DEFLECTION SENSOR FOR MICROCANTILEVERS

FIELD OF THE INVENTION

This invention relates to microcantilevers in general, and in particular to methods and apparatus for detecting the deflection of cantilevers in an atomic force microscope.

BACKGROUND OF THE INVENTION

In an atomic force microscope (AFM) a surface is imaged by scanning the surface with a cantilever. A sharp tip is formed at the end of the cantilever, and as the scanning takes place force interactions between the tip and the surface cause the cantilever to bend or deflect. Generally speaking, the AFM is operated either in the contact mode, in which the tip rides over the surface, or in the non-contact or attractive mode, in which the resonant frequency of a vibrating cantilever is measured with the tip of the cantilever positioned very near the surface. Variations in a gradient of a force between the tip and the surface (e.g., the van der Waals force) cause the resonant frequency of the cantilever to vary as the distance between the tip and the surface changes. In either mode of operation a negative feedback system is used to adjust the distance between the cantilever and the surface so as to maintain the measured parameter (bending or resonant frequency) at a constant, and an error signal in the feedback system is often used to generate an image of the surface. Depending on the properties of the tip and sample and subtleties of the measurement, it is possible to measure a wide range of surface properties, including topography, friction, magnetism, and electrical charge.

AFMs have also been used to modify surfaces, in substitution for conventional lithography systems. Whereas in conventional photolithography systems, resolution is limited by the wavelength of the light that is used to expose the resist, the resolution of an AFM is primarily limited by the sharpness of the tip. For example, hydrogen-passivated single-crystal silicon has been locally oxidized by biasing the tip relative to the silicon. Modifications made by electrical processes have been used to fabricate small-scale electrical devices such as transistors.

Whether the AFM is operating in the contact or non-contact mode, its resolution power depends on its ability to accurately detect the bending or deflection of the cantilever. There are several known ways of doing this. One of the most widely used techniques, described in U.S. Pat. No. 5,144,833, is to direct a light beam against a mirror surface on the back of the cantilever and to sense the location of the reflected beam with a position sensitive photodetector (PSPD). The PSPD normally consists of a pair of adjacent light detectors connected to the inputs of a differential amplifier. When the cantilever is in its equilibrium condition the reflected beam strikes both detectors equally, and the differential amplifier delivers a zero output. The noise generated by the detectors is additive. Since the output signal is a difference signal, the signal-to-noise ratio may be unacceptably low at small tip displacements.

Another known technique is to form a piezoresistive element in the cantilever and to detect the change in resistance of the piezoresistive element as the cantilever bends. While this method is easy to use, in general it is not as sensitive as the optical technique. Other known techniques use tunneling, capacitive and piezoelectric effects.

While the known techniques of detecting the deflection of the cantilever have allowed images to be generated down to the atomic scale, greater resolution could be obtained if the deflection of the cantilever could be detected with even greater precision. Moreover, since arrays of cantilevers are being used to form mask layers and otherwise modify surfaces in semiconductor fabrication and micro-machining operations, it would be particularly useful if a highly accurate system of detecting the deflection of individual cantilevers in an array could be devised.

SUMMARY

In accordance with this invention, a microcantilever includes a pattern of interdigitated fingers that together form a phase grating. The phase grating is used to sense deflection of the microcantilever. In the pattern, movable fingers alternate with reference fingers. The movable fingers are physically connected to the tip of the microcantilever and move with the cantilever as it deflects; the reference fingers are physically connected to the fixed end of the cantilever and do not move as the cantilever deflects. Each reference finger is bounded on either side by movable fingers, and each movable finger is bounded on either side by a reference finger (ignoring the fingers at the ends of the pattern).

In one embodiment of the invention, the fingers are arrayed parallel to the main longitudinal axis of the cantilever; in another embodiment, the fingers are arrayed perpendicular to the main longitudinal axis of the cantilever.

As a whole, the array of interdigitated fingers forms an optical phase grating. A coherent and collimated (laser) light beam directed against the array will be reflected in a Fraunhofer diffraction pattern which includes a zero-order component and several higher-order components. As the cantilever deflects, the intensity of the laser light in the various orders varies considerably more rapidly than, for example, the intensity of a laser beam reflected from a mirror surface on the cantilever.

In the preferred embodiment, the intensity of the first-order component of the light is detected. The intensity of the light in the first order varies from a minimum when the cantilever is undeflected to a maximum when the tip is deflected by a distance equal to onequarter wavelength of the incident light (or an odd multiple thereof). An intensity detector is positioned at an appropriate location to measure the intensity of the first-order component of the reflected light.

The technique of this invention is particularly suitable for detecting the deflection of individual cantilevers in an array of cantilevers. The array may be either one-dimensional (e.g., a single row of cantilevers) or two-dimensional. When measuring the deflection of cantilevers in an array, the intensity detectors for the respective cantilevers must be positioned so that each detector receives only light of the first-order component from a given cantilever to the exclusion of light from any other cantilever. When the array consists of a single row of parallel cantilevers, the possibility that light from adjacent cantilevers will overlap at a detector can be avoided by arranging the interdigitated fingers perpendicular to the longitudinal axes of the cantilevers.

For most cantilever deflections up to one-quarter of a wavelength of the incident light, the intensity of the measured light in an arrangement according to this invention varies significantly more rapidly than does the light measured by the position sensitive photodetector (PSPD) in a conventional "beam bounce" arrangement. (In mathematical terms, dI/dx is greater, where I is the measured intensity of the light and x is the deflection of the tip.) Moreover, since the PSPD in a conventional arrangement detects the location of the reflected light, in reality the PSPD contains two adjacent intensity detectors, and the output signal represents the difference between currents generated by the intensity detectors. Therefore, the output (difference) signal is small in relation to the individual currents when the cantilever is near its equilibrium position, and the signal-to-noise ratio (SNR) in this region suffers. In contrast, since the intensity detector in an arrangement according to this invention detects only the intensity of the reflected light, the single current delivered by the detector at low levels of measured intensity is relatively small, and the (SNR) is not adversely affected.

In other embodiments, other components of the reflected light are detected: for example, the "zeroth" order, or the difference between the first and zeroth orders.

In accordance with another aspect of this invention, the cantilever in an AFM is deflected by an arrangement which uses electrostatic forces between the cantilever and the sample which is being analyzed. The electrostatic forces are created by forming a conductive pad on the surface of the cantilever and applying a voltage between the conductive pad and the sample. When the voltage is applied, the cantilever bends towards the sample. This technique is particularly adaptable to a cantilever which contains interdigitated fingers, with the conductive pad taking the form of a metal coating that is applied to the surfaces of both the reference and movable fingers. The bending of the structure which links one set of fingers to the tip of the cantilever ceases when the tip comes into contact with the sample surface, while the structure which links the other set of fingers to the fixed end of the cantilever is free to bend further. As a result, the vertical separation between the two sets of fingers increases and can be used to detect the force between the tip and the sample by means of the optical techniques described above.

In a dynamic version of this embodiment, an AC signal is applied to the metal coating on the cantilever, and the amplitude of the resulting vibrations of the reference set of fingers is detected. This amplitude varies with the separation between the sets of fingers. If the frequency of the AC signal is greater than 1 kHz, this arrangement is particularly useful in avoiding the so-called "1/f" noise that has been found to be dominant in the 0–1 kHz bandwidth.

BRIEF DESCRIPTION OF THE DRAWING

FIGS. 26A–26E illustrate steps in a process of fabricating a mechanically biased cantilever.

DETAILED DESCRIPTION

Embodiments of this invention fall into two basic groups: in the first group the fingers are oriented parallel to the main longitudinal axis of the cantilever; in the second group the fingers are oriented perpendicular to the main longitudinal axis of the cantilever.

Figure 1A:
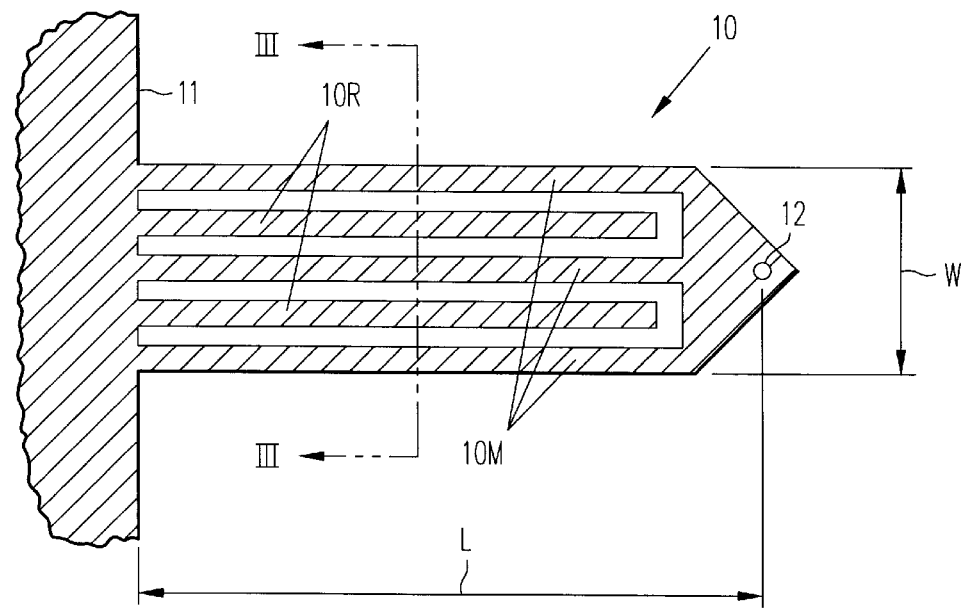
FIGS. 1A and 1B illustrate top and side views, respectively, of a cantilever according to a first embodiment of this invention, in which the fingers are parallel to the main axis of the cantilever.
Figure 1B:
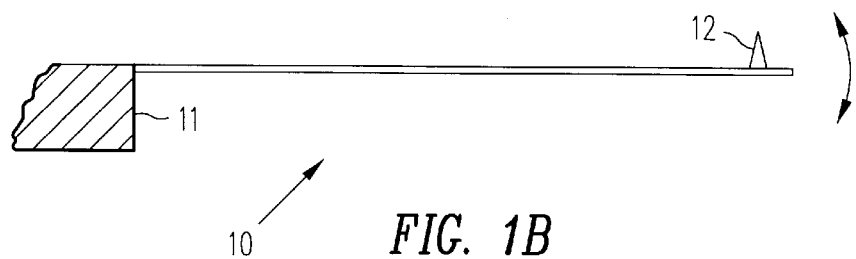

The first group is exemplified by cantilever 10 shown in FIGS. 1A and 1B, which are top and side views, respectively. Cantilever 10 is positioned in the probe portion of an atomic force microscope in a known manner and has a fixed end which extends from a silicon substrate 11 and a free end which includes a tip 12. Cantilever 10 has a length L which could be, for example, 500 $\mu$m and a width W which could be, for example, 90 $\mu$. Cantilever 10 is typically several $\mu$m thick.

Cantilever 10 includes a set of movable fingers 10M which connect the tip 12 with the substrate 11. Movable fingers 10M are interdigitated with a set of reference fingers 10R which are attached to the substrate 11. Thus, as cantilever 10 deflects in a vertical direction (see arrow in FIG. 1B), the movable fingers 10M bend while the reference fingers 10R remain stationary. Fingers 10M and 10R are preferably formed of a highly elastic and robust material such as silicon nitride, and the top surface of cantilever 10 is coated with an optically reflective (specular) material such as aluminum or gold. Although cantilever 10 contains a total of five fingers (three movable fingers and two reference fingers), other embodiments may contain different numbers of fingers.

As shown in FIG. 1A, cantilever 10 extends from the silicon substrate 11 in a direction perpendicular to the edge of substrate 11. In other embodiments, the cantilever may extend from the edge of substrate 11 at other angles, for example 45°.

As described above, cantilever 10 is used to analyze the surface of a sample (not shown) by scanning cantilever 10 over the sample with tip 11 either on or near the sample surface. The contour (or other measured characteristic) of the surface is sensed by detecting the deflection or bending of cantilever 10. The signal which represents the deflection of cantilever 10 is typically sent to a negative feedback circuit which adjusts the vertical position of the cantilever to maintain a constant separation between the cantilever and the sample. As a result, the deflection of the cantilever and the resultant tracking force of tip 11 on the surface of the sample are maintained constant. The error signal in the feedback circuit is normally used to generate a profile of the sample surface.

The precision with which the deflection or bending of cantilever 10 can be detected is very important in determining the resolution of the AFM: the greater the precision, the higher the resolution. In accordance with this invention, the deflection of cantilever 10 is detected by the arrangement shown in FIG. 3, which shows a cantilever 10 taken at cross-section III—III of FIG. 1A.

Source 13 is a source of a beam 21I of light that is incident on the top surface of cantilever 10. In one embodiment, beam 21I is coherent and collimated. Since the top surface of cantilever 10 is specular, beam 21I is reflected. Moreover, as is apparent from FIG. 3, the arrangement of interdigitated fingers 10M and 10R acts as an optical phase grating, causing the reflected beam 21R to take the form of a diffraction pattern having components of different orders. These components are directed to a photodetector 14.

Figure 3:
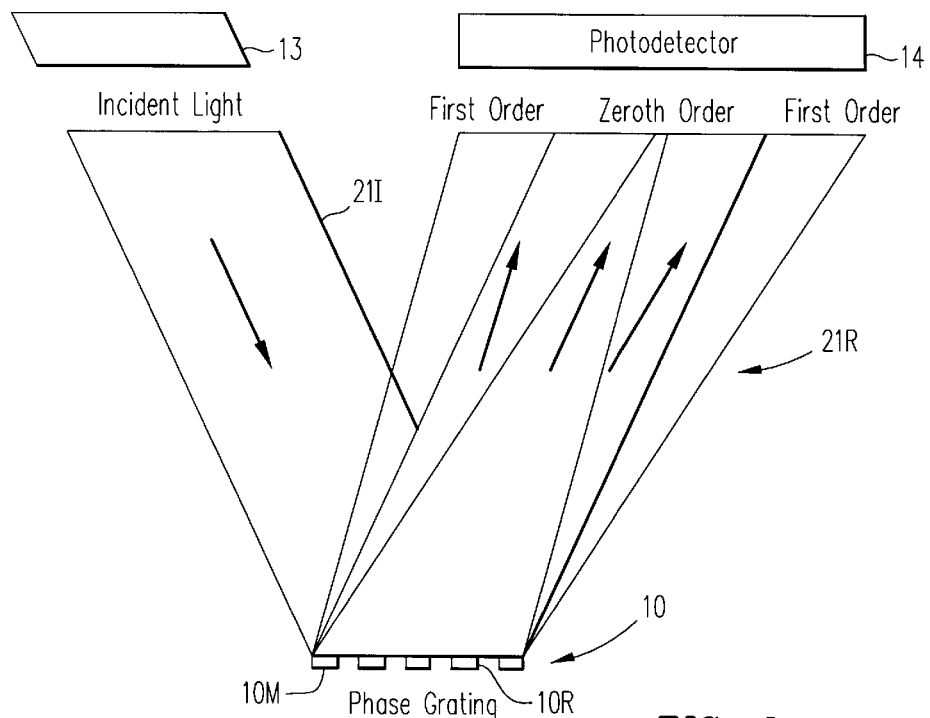
FIG. 3 illustrates the diffraction pattern of light reflected from the cantilever of FIGS. 1A and 1B.
Figures 4A, 4B:
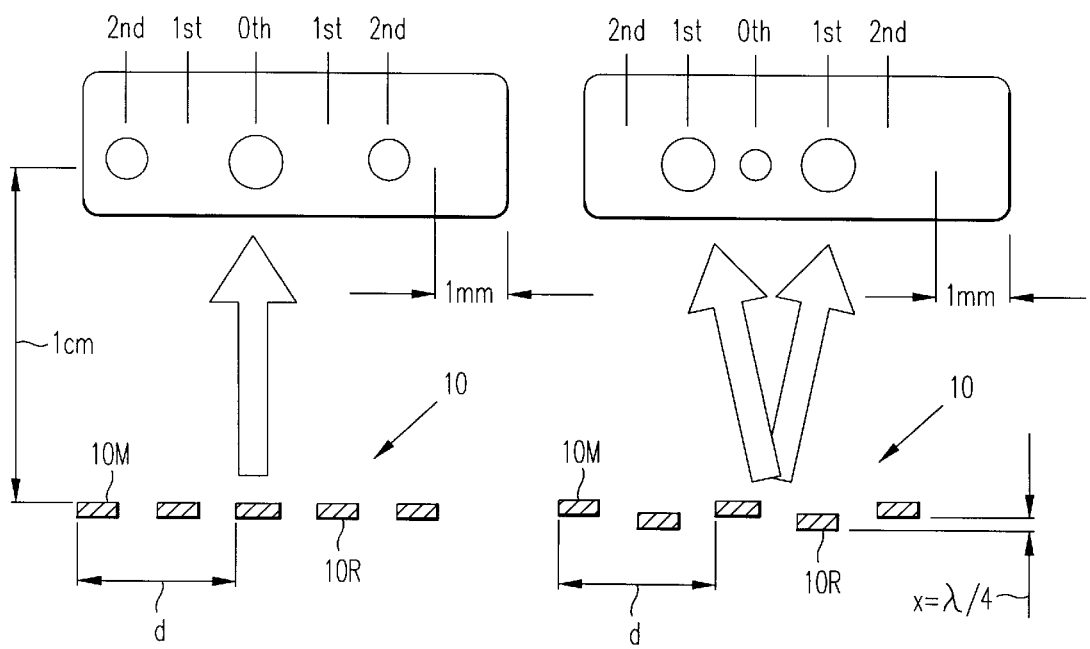
FIGS. 4A and 4B are more detailed views of the cross-section of cantilever 10 shown in FIG. 3.

FIG. 3 shows the zeroth order component flanked on both sides by the first-order component. FIGS. 4A and 4B are more detailed views of the cross-section of cantilever 10 shown in FIG. 3, showing in particular the grating period d and the positions of the reference fingers 10R when interdigitated fingers 10M and 10R are aligned (FIG. 4A) and when tip 11 is displaced by a distance x (FIG. 4B).

The intensities of the different orders of reflected light are dependent on the distance x. When cantilever 10 is in its equilibrium position (x=0) as shown in FIG. 4A, light reflected from fingers 10M and 10R add in phase; consequently, the intensity of the zeroth order component is at a maximum and the first order component is at a minimum. Conversely, when the tip displacement x is equal to one-quarter of the wavelength of the incident light ($\lambda$/4) or a multiple thereof, light reflected from neighboring fingers interferes destructively; consequently, the intensity of the zeroth order component is at a minimum and the first order component is at a maximum.

For best sensitivity, the reflective areas of neighboring fingers should be equal. The angle $\theta$ between the first order component and the zeroth order component is determined by the grating period d and the wavelength $\lambda$ of the incident light according to the following equation:

$$\sin\theta = \lambda/d \tag{1}$$

For example, referring to FIG. 4A, if d=20 $\mu$m and $\lambda$=633 nm (He-Ne laser), then $\theta$=1.813 degrees.

While the foregoing example includes laser light having a wavelength of 633 nm, other types of light and other frequencies may be used. For example, light of shorter wavelengths (e.g., 447 nm) may be desirable in applications that require increased resolution. Furthermore, other types of electromagnetic radiation may be used if the cantilever is capable of reflecting the selected radiation and the grating period is not large relative to the wavelength.

The intensity of the first order component varies nonlinearly according to the following relationship:

$$I = \sin^2(2\pi x/\lambda) \tag{2}$$

where I is the intensity of the first order component, x is the tip displacement, and $\lambda$ is the wavelength of the incident light.

Using equation 2, the deflection x of cantilever 10 can be obtained by measuring the intensity of the first order component of the reflected beam 21R and solving for x. The intensity of the first order component is detected by a detector placed such that the first order component is separated from the other orders. For the example given above, at a distance of 15 mm the first order component is separated from the zeroth order component by about 470 $\mu$m.

The foregoing method of detecting the intensity of the first order component provides far greater sensitivity than the conventional optical technique, described above, of reflecting a laser beam against a mirror surface on the back of the cantilever and sensing the position of the reflected beam. Optical phase gratings and their resulting diffraction patterns are well-known phenomena and are described, for example, in Goodman, *Introduction to Fourier Optics*, McGraw-Hill (1968), pp. 62–70.

In the above-described embodiment the intensity of the first order component is measured. However, other embodiments measure the intensity of the zeroth order component or, to reduce the effects of intensity fluctuations of the laser beam, measure the difference between the intensities of the zeroth and first order components.

Figure 5:
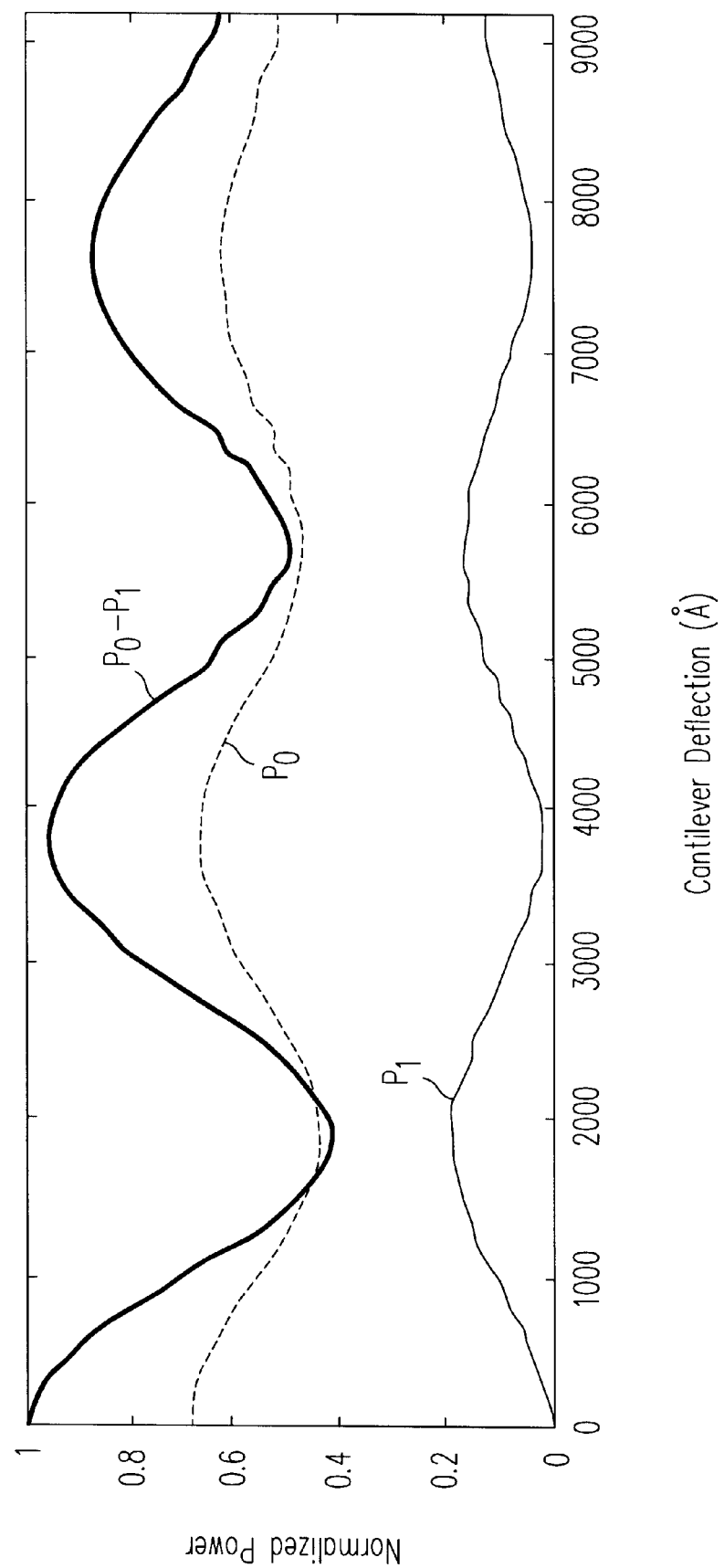
FIG. 5 is a graph showing the reflected power (vertical axis) of the zeroth and first order components ($P_0$, $P_1$) as a function of the tip displacement x (horizontal axis) of a cantilever.

FIG. 5 is a graph showing the reflected power (vertical axis) of the zeroth and first order components ($P_0$, $P_1$) as a function of the tip displacement x (horizontal axis) of a cantilever having a length L of 225 $\mu$m and a width W of 150 $\mu$m exposed to light having a wavelength $\lambda$ equal to 670 $\mu$m. Also shown is a curve representing the normalized difference between the zeroth and first order components ($P_0 - P_1$).

The difference curve $P_0-P_1$ is generally sinusoidal with a maximum at x=0. FIG. 5 shows that the power, and therefore intensity, of reflected light varies continuously between the relative extremes of FIGS. 4A and 4B as the tip displacement x changes.

Figure 6:
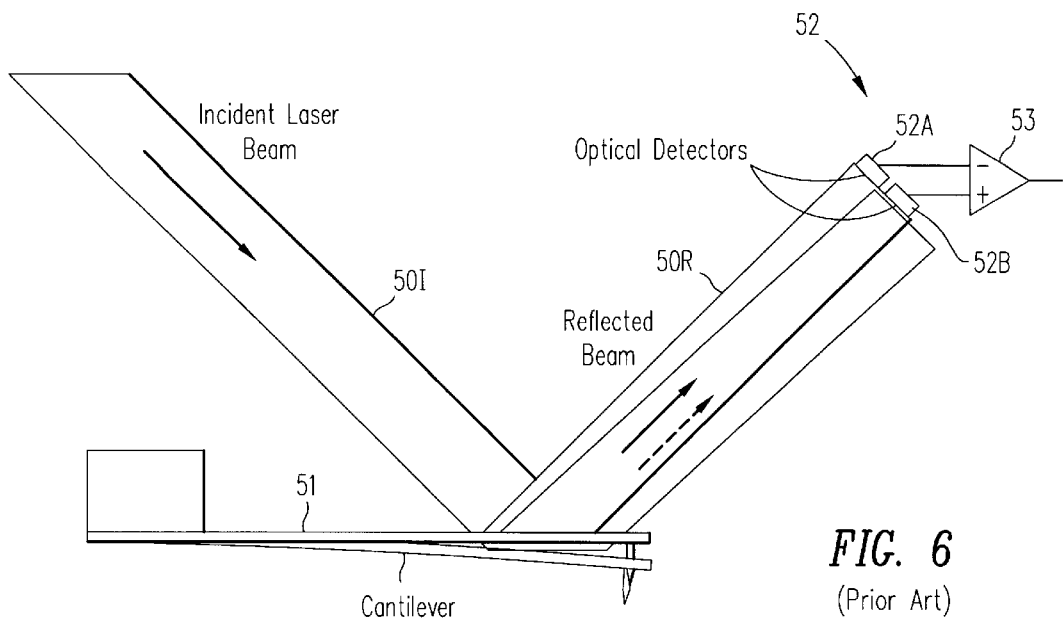
FIG. 6 illustrates a conventional optical deflection detection arrangement for a cantilever in an AFM.

FIG. 6 illustrates schematically the layout of a prior art system wherein an incident laser beam 50I is reflected from a cantilever 51 to a PSPD 52, which contains a pair of side-by-side light detectors 52A and 52B. The outputs of detectors 52A and 52B are delivered to a differential amplifier 53. When cantilever 51 is in its equilibrium state, the reflected light beam 50R falls equally on detectors 52A and 52B, and amplifier 53 delivers a zero output. As shown, when cantilever 51 is deflected, one of the detectors delivers a greater output (in this case detector 52B) and differential amplifier 53 consequently delivers a non-zero output.

Figure 7:
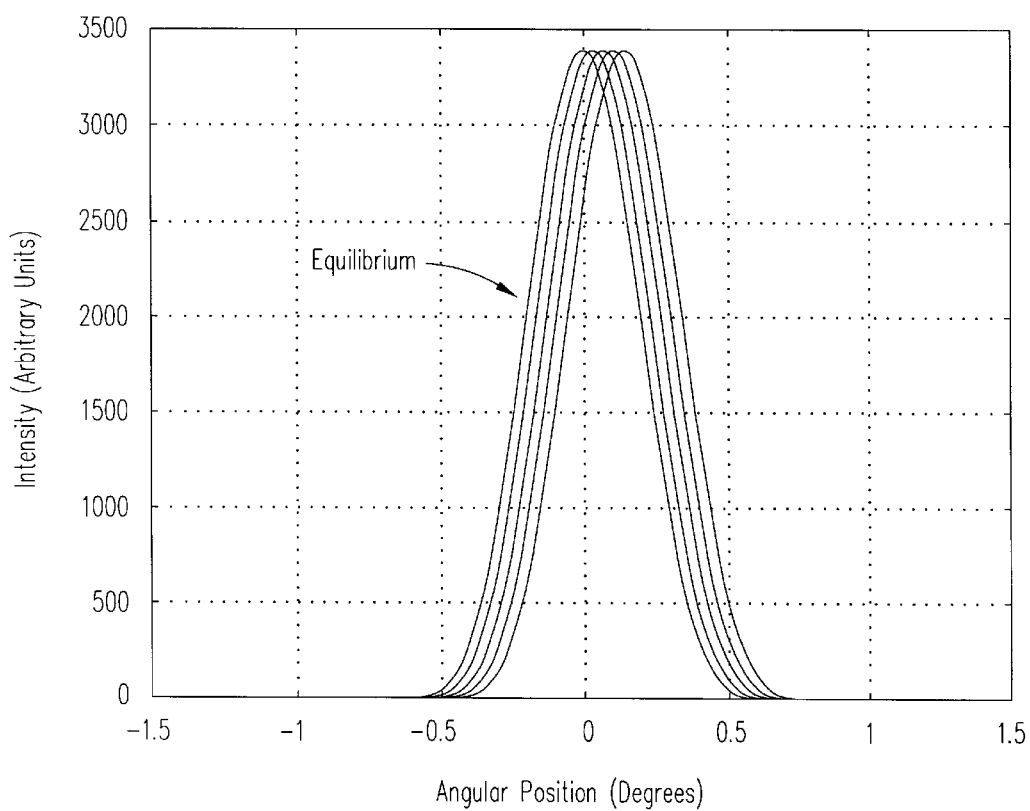
FIG. 7 is a graph showing the intensity of the light in the prior art arrangement of FIG. 6 as a function of the deflection of the cantilever (measured angularly).

FIG. 7 shows a graph illustrating the calculated intensity profile of reflected beam 50R (in arbitrary units) as a function of the deflection of cantilever 51 from its equilibrium position (degrees). The cantilever was 500 µm in length and the incident light had a wavelength $\lambda$ of 633 nm and a gaussian intensity profile with a σ of 25 µm. Each successive curve from the equilibrium represents a displacement of the tip by an increment of $\lambda/4$.

Figure 8:
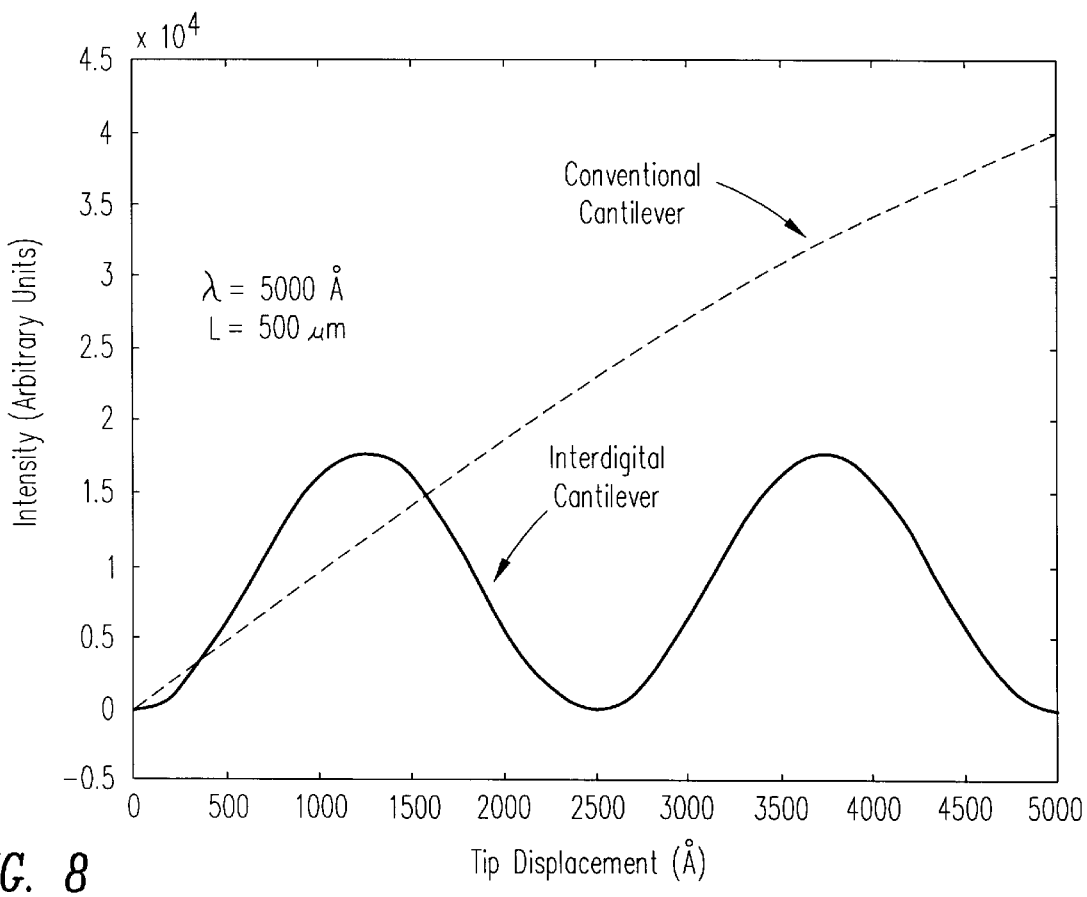
FIG. 8 is a graph showing the calculated output signals as a function of tip displacement for a conventional cantilever (dashed curve) and an interdigital cantilever (solid curve).

FIG. 8 is a graph of the intensity of first order components as a function of tip displacement for a conventional cantilever (dashed curve) and an interdigital cantilever (solid curve). The wavelength of the incident light was 5000 Å and the length of the cantilever was 500 µm. While the conventional system generates a larger output signal than the interdigital cantilever for very small displacements (up to ~300 Å) the output signal of the interdigital cantilever is larger than that of the conventional cantilever for displacements up to $\lambda/4$ (1250 Å).

In terms of cantilever performance, the graph of FIG. 8 is somewhat misleading. At small displacements the signal-to-noise ratio (SNR) is a more important measure of cantilever performance than is the signal strength. A small signal with a higher SNR is better than a large signal with a poor SNR. For present purposes, it is assumed that the dominant source of noise is the shot noise in the light detectors; the noise generated by the amplifiers is neglected. The shot noise generated in a photoconductive diode, which is the operative component of most light detectors, is given by the following equation:

$$<i_n>^2 = 2qIB \quad (3)$$

where $<i_n>^2$ is the noise current squared, q is the charge of an electron, I is the current through the diode, and B is the bandwidth.

In the conventional system shown in FIG. 6, the currents output by the detectors 52A and 52B are subtracted in the differential amplifier 53 to obtain the output signal. When the cantilever is at equilibrium, each detector (diode) carries a large current, and therefore generates a large shot noise. However, because the currents are equal in amplitude, the output signal of the differential amplifier is zero. Thus, the shot noise is large relative to the output signal for output signals near zero. In other words, the SNR is low for relatively low-level output signals.

Figure 9:
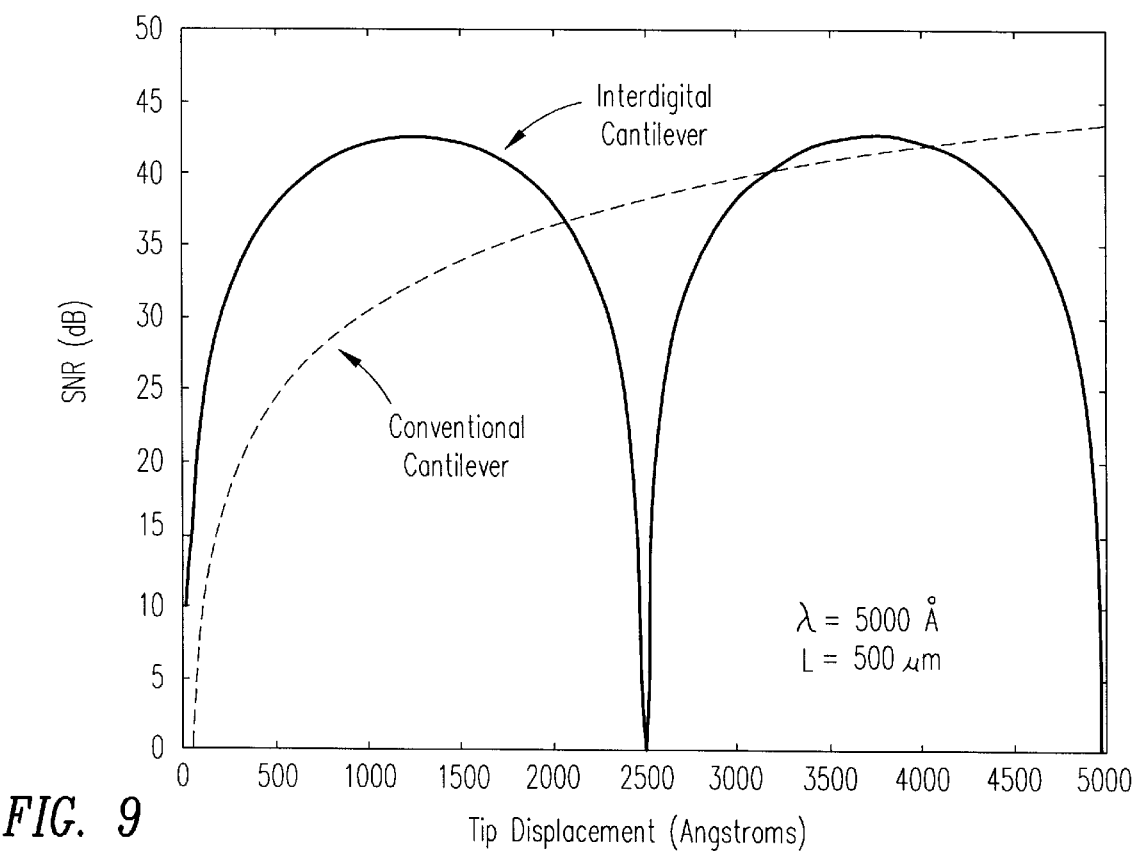
FIG. 9 is a graph showing the signal-to-noise ratio (SNR) of the first order component of diffracted light in the interdigital cantilever of FIGS. 1A and 1B, as well as the SNR of the light in the prior art arrangement of FIG. 6, as a function of the vertical displacement of the cantilever tip.

In contrast, in a system containing an interdigital cantilever, there is only one light detector. When the detector signal is small, the noise generated by the detector is also small. A comparison of the calculated SNR ratios in a conventional system (dashed line) and a system containing an interdigital cantilever (solid line) is shown in FIG. 9. Comparing FIGS. 8 and 9, for very small tip displacements the signal generated by the conventional cantilever is greater in amplitude than that of the interdigital cantilever, but the interdigital cantilever exhibits a higher SNR. These small tip displacements represent a technologically important range for an AFM.

Because the output signal of the interdigital cantilever has a periodicity equal to $\lambda/2$, a single output can correspond to a number of different values of the tip displacement. This is not a practical problem, however, because it is common to place the deflection sensor and actuator in feedback such that the cantilever deflection remains constant.

Figure 2:
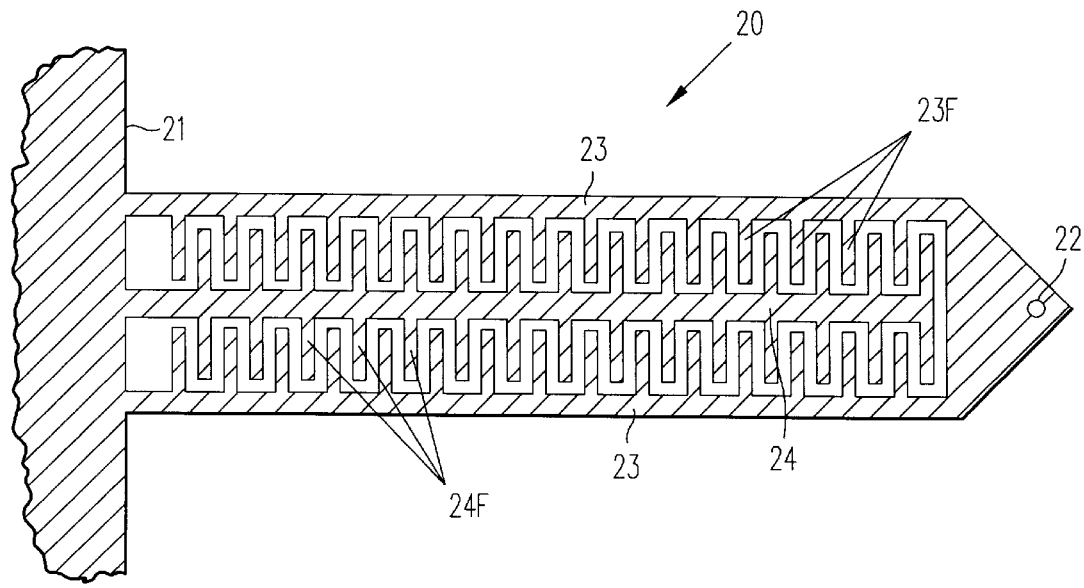
FIG. 2 illustrates a top view of a cantilever according to a second embodiment of this invention, in which the fingers are perpendicular to the main axis of the cantilever.

The second group of embodiments is exemplified by cantilever 20 illustrated in FIG. 2. Cantilever 20 extends from a silicon substrate 21 and has a tip 22 located near its free end. Cantilever 20 includes a pair of moving arms 23 extending from substrate 22 to its free end and a reference arm 24, also extending from substrate 21. Fingers 23F project from moving arms 23 and are interdigitated with fingers 24F projecting from reference arm 24. As is apparent, fingers 23F and 24F are perpendicular to the main longitudinal axis of cantilever 20. As the moving arms 23 bend, fingers 23F and 24F form an optical phase grating that is similar to the phase grating of cantilever 10 shown in FIG. 1 except that the diffraction pattern spreads out parallel to the main axis of cantilever 20.

One problem with using AFMs for surface analysis or lithography is obtaining a satisfactory throughput. Typical scan rates of an AFM in modes where feedback is used to maintain a constant tip-sample force range from 10 to 100 µm/sec. At such rates, any large-scale lithographic or data storage system would operate in time-frames of years. The throughput can be improved dramatically, however, by increasing the number of cantilevers and the scan rate.

The main problems associated with increasing the number of cantilevers go beyond the difficulty of fabricating an array of cantilevers. Other problems include maintaining a constant tip-sample force for each of a number of cantilevers and detecting the deflection of each cantilever separately. The principles of this invention can readily be applied to solve these problems.

Figures 10A, 10B:
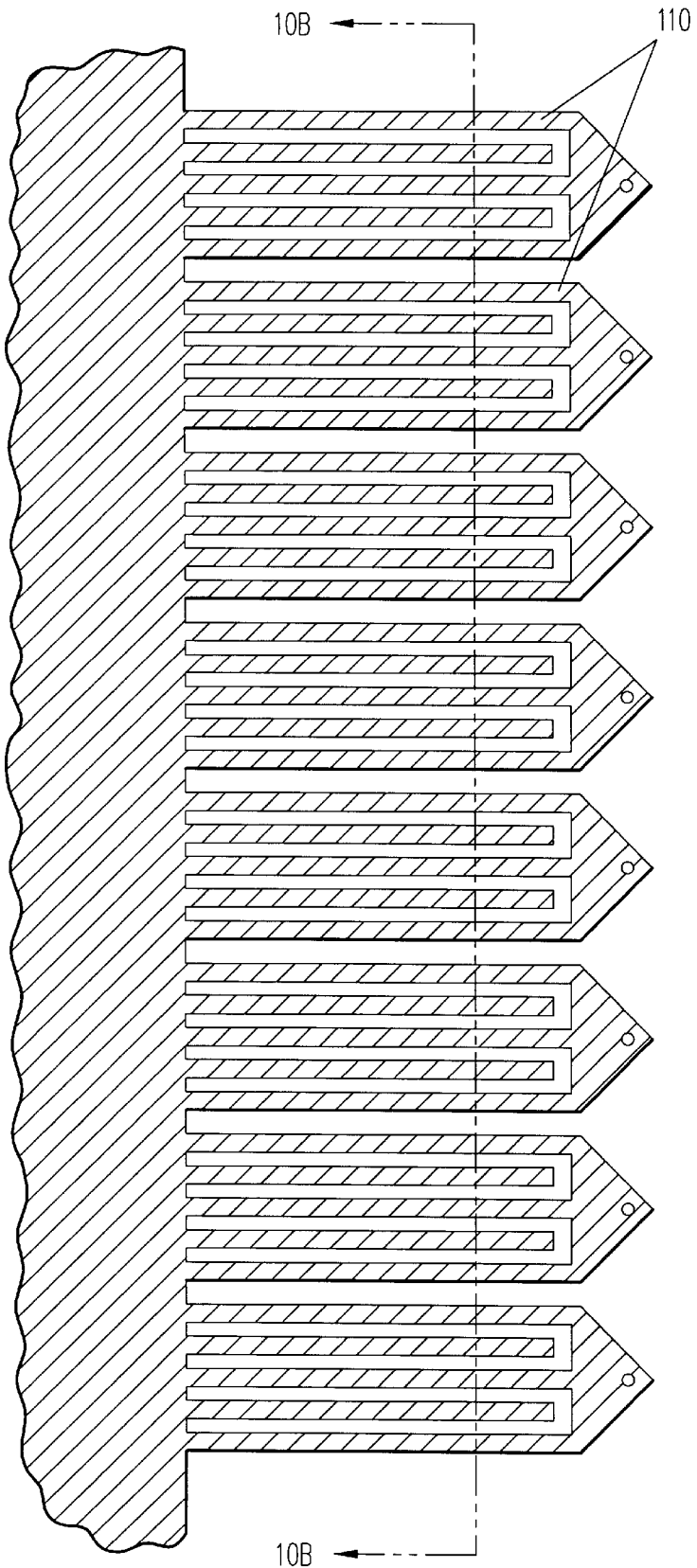
FIG. 10A illustrates a top view of a onedimensional array of cantilevers 110, in which each cantilever is similar to cantilever 10 of FIG. 1.
FIG. 10B is a view of the cantilevers 110 at cross-section 10B—10B shown in FIG. 10A.

FIG. 10A illustrates a top view of a one-dimensional array of cantilevers 110, in which each cantilever is similar to cantilever 10 of FIG. 1. FIG. 10B is a view of the cantilevers 110 at cross-section 10B—10B shown in FIG. 10A.

Figure 11:
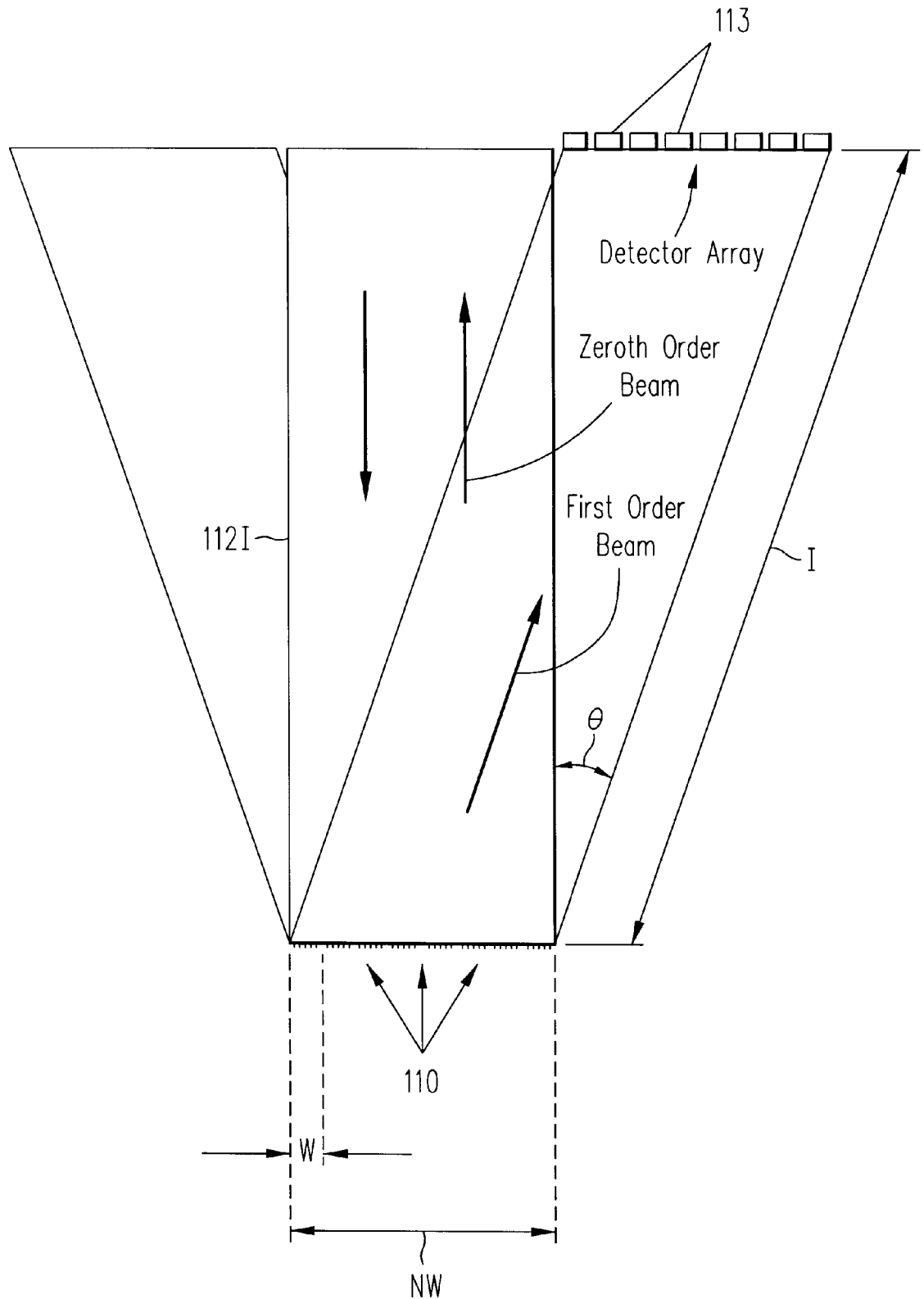
FIG. 11 is a cross-sectional view of cantilevers 110.

If light is reflected from the array of cantilevers 110, the first order component of diffracted light from each cantilever can be detected separately, provided that the cantilevers are structured so as to provide a sufficiently large diffraction angle. This is illustrated in FIG. 11, which is a cross-sectional view of cantilevers 110 similar to FIG. 10B but on a reduced scale. A light beam 112I is incident on the cantilever array from directly above the cantilevers, and the zeroth order components from cantilevers 110 from for a beam that essentially coincides with the incident beam 112I. The first order components from cantilevers 110 are reflected at in angle θ to incident beam 112I. An array of light detectors 113 is positioned such that each detector in the array receives the first order component from a corresponding cantilever 110 with no interference from the zeroth order components.

To achieve a sufficiently large angle θ to provide this separation of the first order components, the periodicity of the fingers in cantilevers 110 must be made sufficiently small. For example, a cantilever width W of 200 µm and a finger period of 2 µm provide a sufficiently large angle θ (approximately 14°) to receive the first order component separately from a one-dimensional array of 50 cantilevers.

This level of periodicity can be achieved with current silicon micro-machining technology.

A second consideration is the placement of detectors 113 at a distance that prevents diffracted light beams from neighboring cantilevers from interfering with each other. To avoid this, the detector array is placed no farther than $$1 \leq W^2/\lambda \tag{4}$$

from the cantilever array, where W is the width of each cantilever. This condition ensures that the spreading of the diffracted beams is not significant.

Referring again to FIG. 11, if N cantilevers 110 are arranged in a one-dimensional array along with an array of N detectors 113 placed at a distance $1=W^2/\lambda$, the angle θ of the first order components is established to satisfy the relationship $$\sin \sigma \geq N\lambda/W \tag{5}$$

to provide clearance between the zeroth and first order components. Thus configured, the periodicity of the fingers in each of cantilevers 110 satisfies the relationship:

$$d \leq W/N \tag{6}$$

For example, if W=200 μm and N=50, d is no greater than 4 μm (e.g., each finger could be 1 μm wide with 1 μm separation between fingers). The detector array is placed at a distance 1=8 cm from the cantilever array. From equation (6), it is evident that the number of cantilevers that can be operated in parallel is limited by the minimum feature size of the silicon micro-machining technology.

Figure 12:
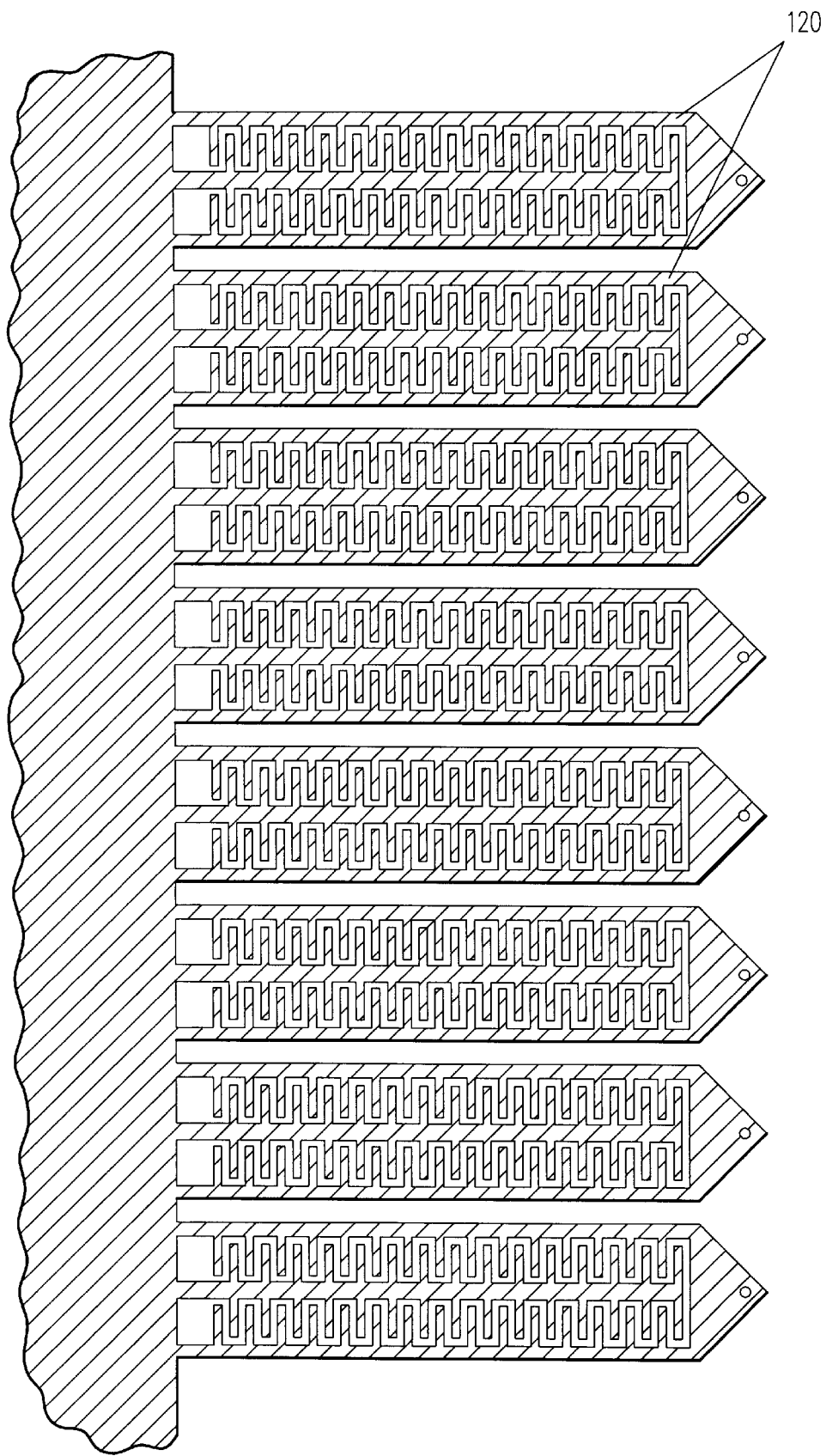
FIG. 12 illustrates an array of cantilevers 120 that are similar to cantilever 20 in FIG. 2.

FIG. 12 illustrates an array of cantilevers 120 similar to cantilever 20 in FIG. 2. Because the phase grating is perpendicular to the main axis of each cantilever, the diffraction angle is perpendicular to the one-dimensional array of cantilevers. Hence, there is no danger of the zeroth order component overlapping the first order component if the detector array is placed a distance $1 \leq W^2/\lambda$ from the cantilever array, where W is the width of each cantilever, and each cantilever has at least one pair of fingers. Typically, each cantilever has many finger pairs, so the zeroth order component is well separated from the first order component.

Figure 13:
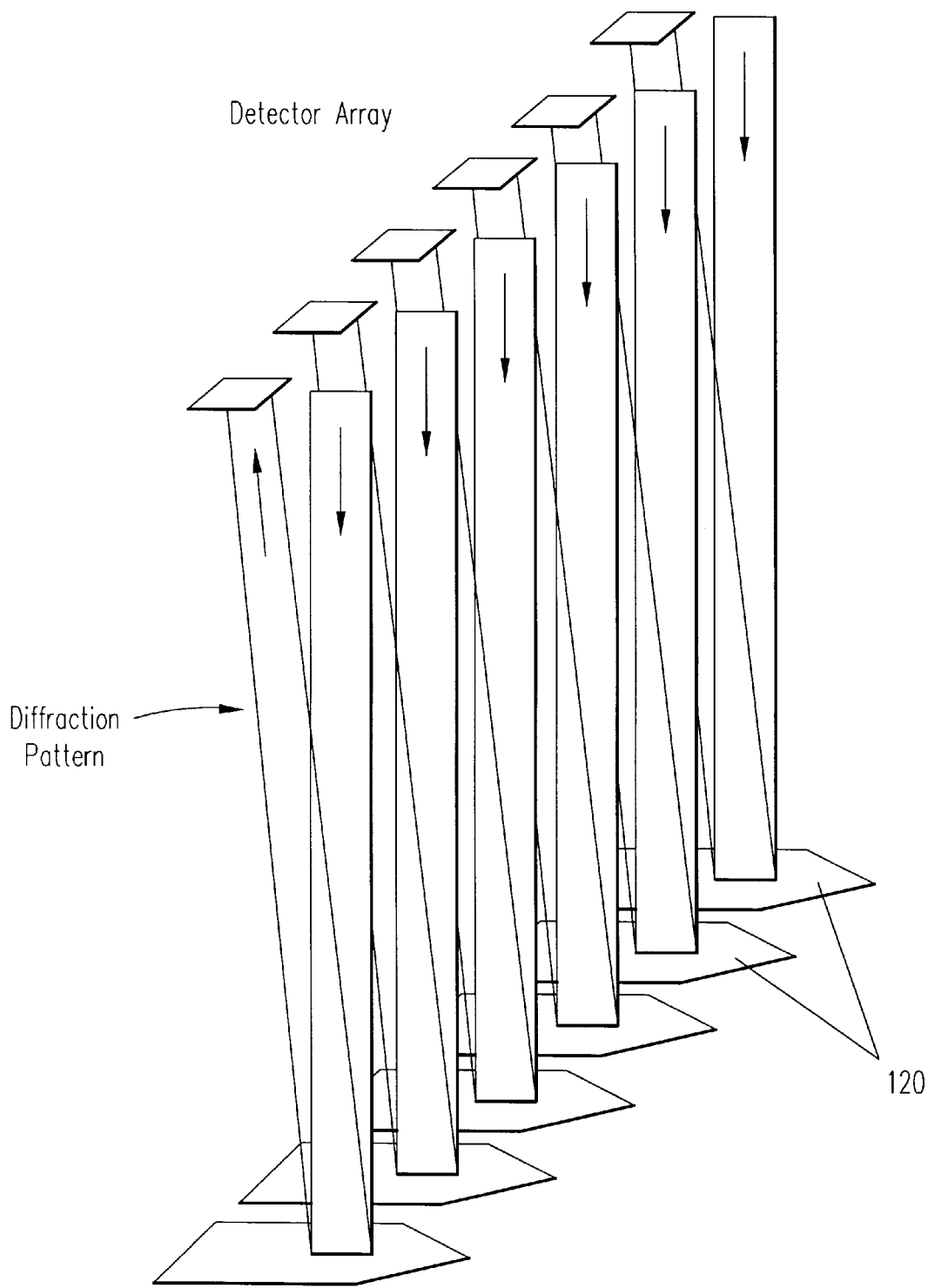
FIG. 13 is a perspective view showing how the diffraction pattern is reflected from the array of cantilevers 120.

FIG. 13 is a perspective view showing how the diffraction pattern is reflected from the array of cantilevers 120.

Figure 14:
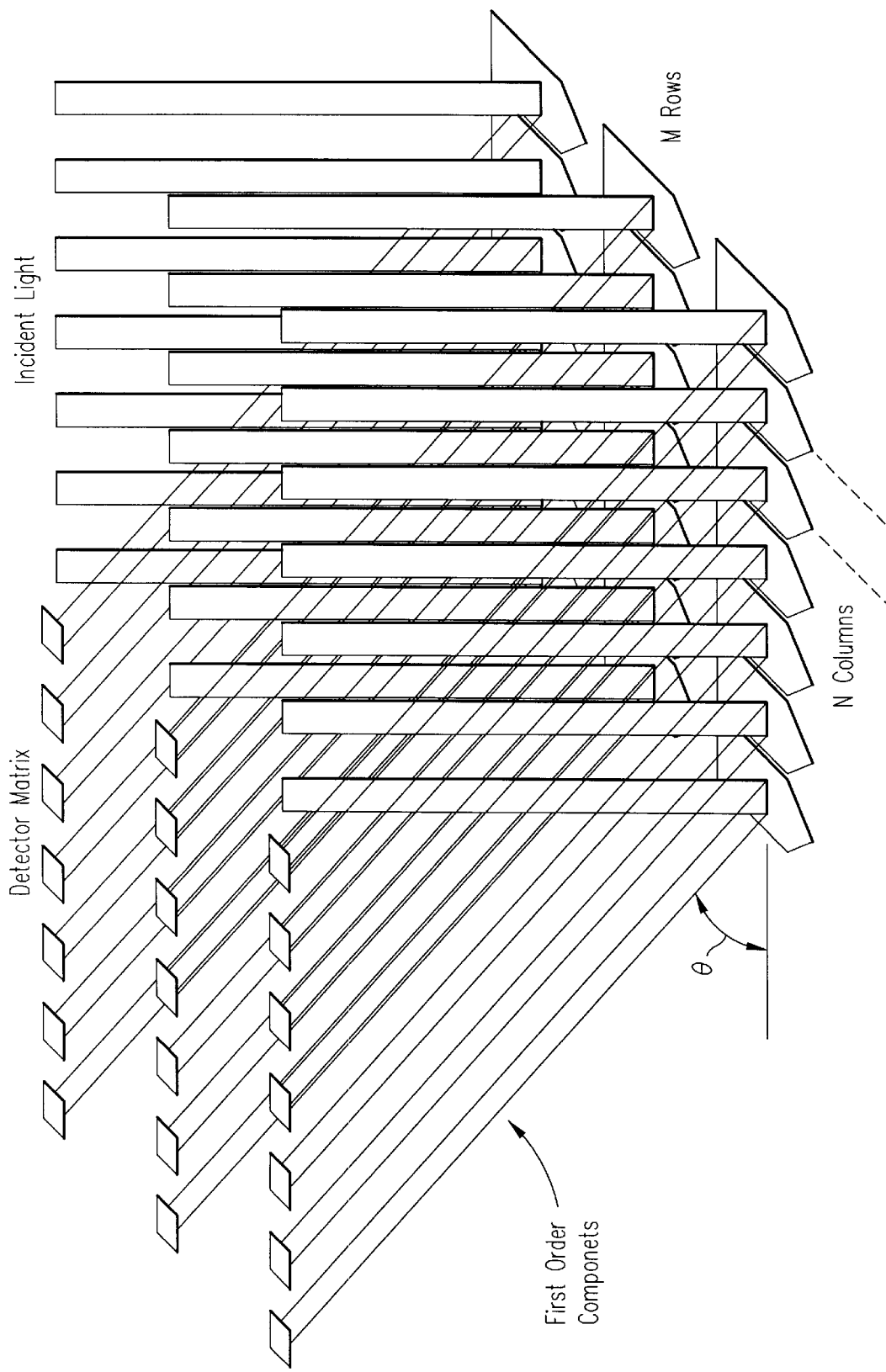
FIG. 14 is a perspective view of the placement of an array of detectors for receiving the first order components of an array of cantilevers of the kind shown the FIG. 1.
Figure 15:
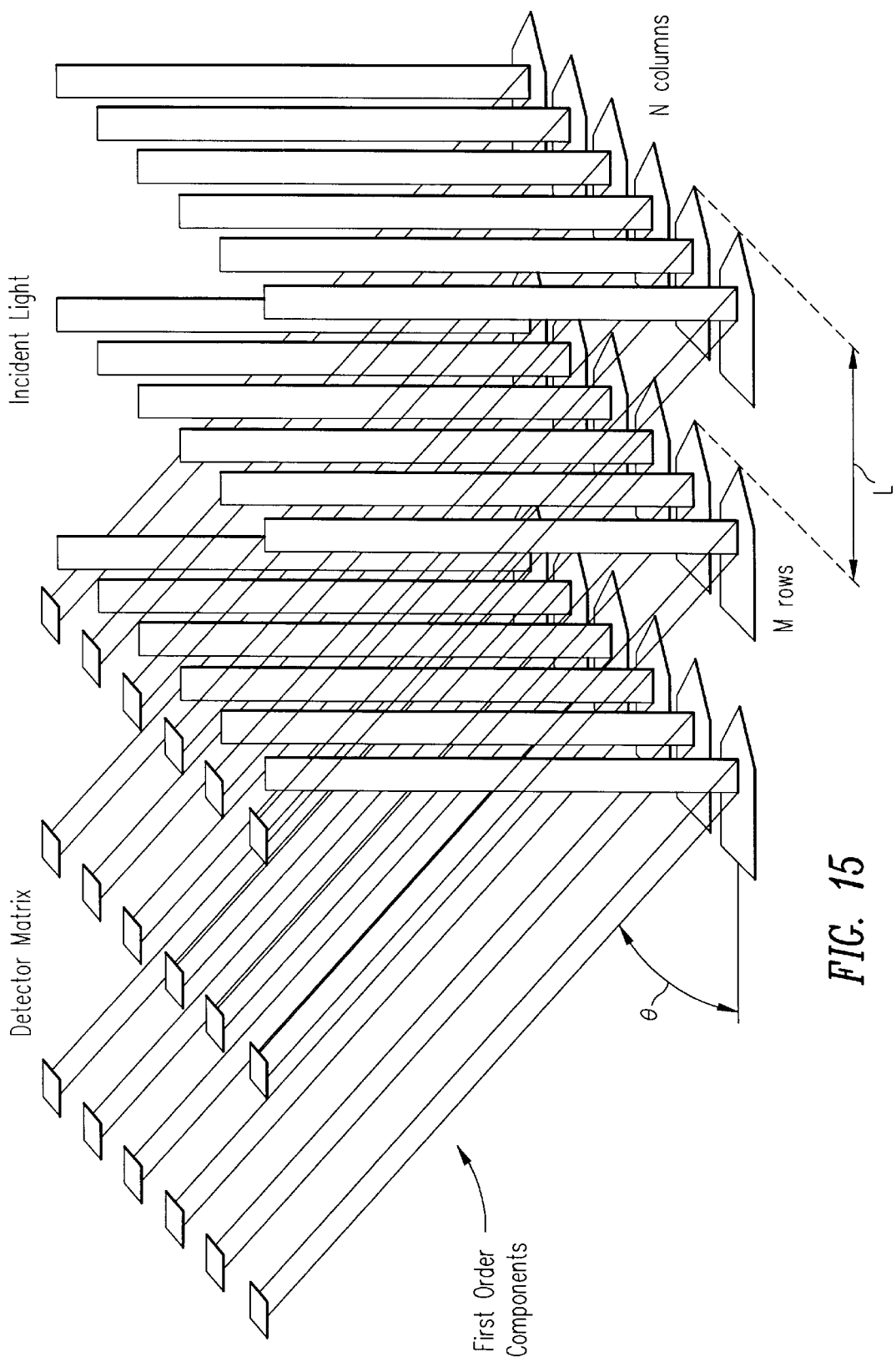
FIG. 15 is a perspective view of the placement of an array of detectors for receiving the first order components of an array of cantilevers of the kind shown the FIG. 2.

The scanning capability of an AFM can be further improved by using a two-dimensional array of cantilevers and a corresponding two-dimensional array of detectors. FIGS. 14 and 15 are perspective views of the placement of an array of detectors for receiving the first order components of an array of cantilevers of the kind shown the FIGS. 1 and 2, respectively. In both cases, the cantilever array includes M rows of cantilevers with N cantilevers in each row. In each case, the limits of silicon micro-machining technology establish a limit on the number of cantilevers in one dimension.

For the arrangement shown in FIG. 14, the number of cantilevers in each row (N) does not exceed the limit established by the following equation:

$$N \leq W/d \tag{7}$$

where W is the period of the cantilevers in each row and d is the periodicity of the fingers in the individual cantilevers. Since the cantilevers have fingers parallel to their main axes (see FIG. 1), there is no limit to the number of rows of cantilevers (M).

Figure 16:
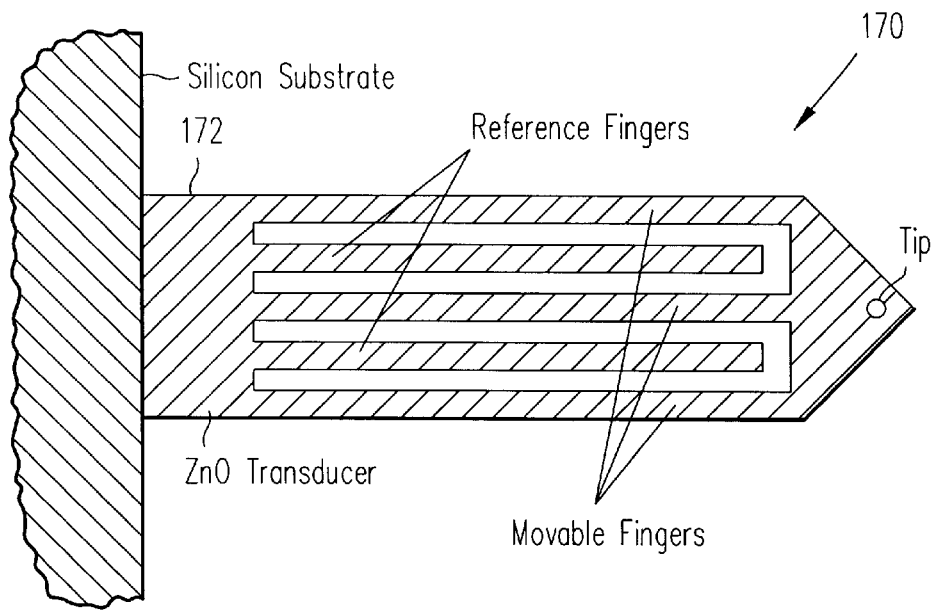
FIG. 16 is plan view of a cantilever 170 that includes a piezoelectric transducer 172 between the silicon substrate and the arrays of movable and reference fingers.

For the arrangement shown in FIG. 16, the number of rows (M) does not exceed the limit established by the following equation: where L is the period of the rows. Since the cantilevers have fingers perpendicular to their main axes (see FIG. 2), there is no limit on the number of cantilevers in each row (N).

The second problem in operating an array of cantilevers is to provide a system that will maintain a constant tip-sample force for each cantilever in the array. This problem can be solved by controlling the tip-sample force for each cantilever separately with an integral actuator of the kind described in U.S. patent application Ser. No. 08/558,563, filed Oct. 31, 1995, which is incorporated herein by reference. The integral actuator includes a piezoelectric transducer incorporated into a relatively thick section of the cantilever near its fixed end. Such an arrangement is shown in FIG. 16. Cantilever 170 of FIG. 16 is similar to cantilever 10 of FIG. 1 except that it contains a piezoelectric transducer 172 between the silicon substrate and the arrays of movable and reference fingers. Piezoelectric transducer 172 includes a film of ZnO sandwiched between two electrodes. As a voltage is applied to the electrodes of transducer 172, it expands or contracts, causing cantilever 170 to bend so that the tip of the cantilever 170 moves in a vertical direction.

In cantilever 170, transducer 172 drives both the movable and reference fingers. The tracking force between the tip and the sample causes the movable fingers to bend in the opposite direction, and this creates a relative separation between the movable and reference fingers that is used, as described above, to sense the deflection of the cantilever. While in cantilever 200 the fingers are parallel to the main axis of the cantilever, a similar arrangement can be fabricated with the fingers perpendicular to the main axis of the cantilever.

Figure 17:
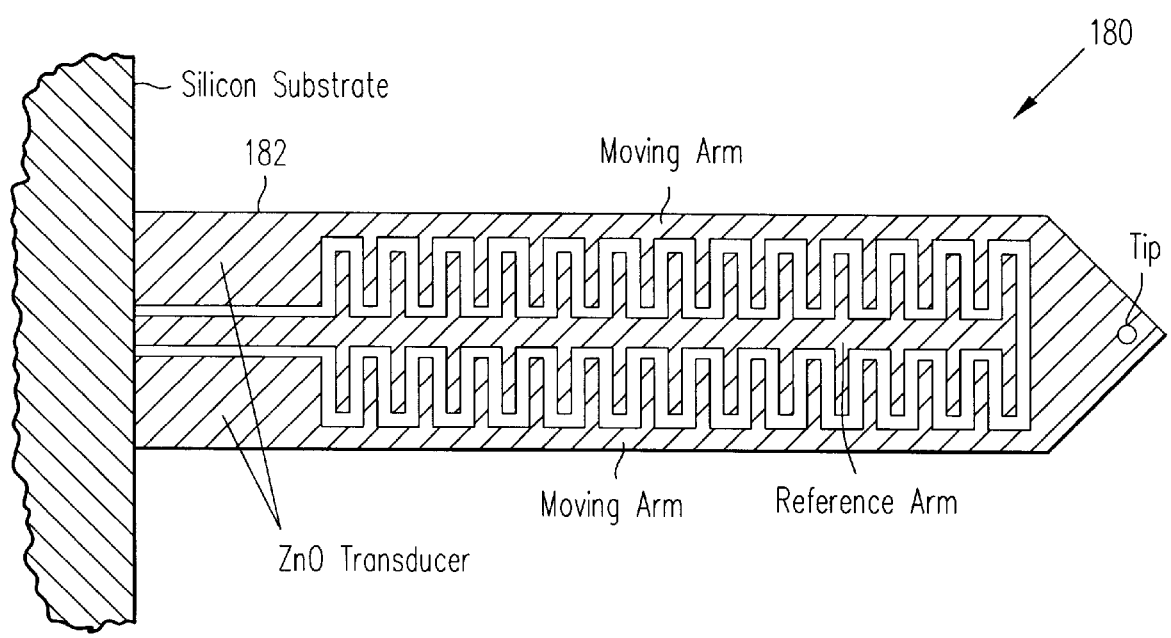
FIG. 17 illustrates a top view of a cantilever having an integral piezoelectric actuator adapted to move only the movable fingers of the cantilever.

Alternatively, the integral actuator can be used to drive only the movable fingers, as in cantilever 180 shown in FIG. 17. Piezoelectric transducer 182 is similar in structure to transducer 172 but is connected only to the moving fingers of cantilever 180. Since the reference fingers do not bend as transducer 182 drives the tip in a vertical direction, the optical sensing arrangement measures the absolute displacement of the moving fingers. While in cantilever 180 the fingers are perpendicular to the main axis of the cantilever, a similar arrangement can be fabricated with the fingers parallel to the main axis of the cantilever.

Figure 18:
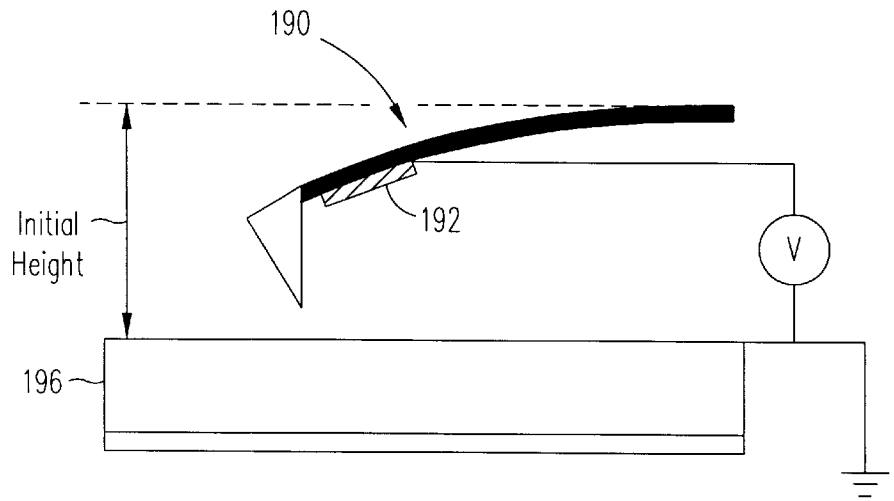
FIG. 18 illustrates a cantilever in which the tipsample separation is controlled by means of electrostatic forces between the sample and a metal patch on the cantilever.
Figure 19:
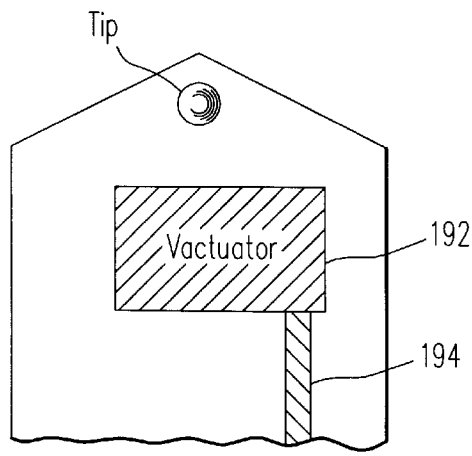
FIG. 19 illustrates a more detailed view of the cantilever of FIG. 18.

Alternatively, provided that the sample surface (or an underlayer) is conductive, the tip-sample force can be maintained constant by using electrostatic forces. FIG. 18 is a conceptual view of a cantilever 190 with a metal patch 192 deposited on the bottom surface of the cantilever. As shown in the more detailed view of FIG. 19, metal patch 192 is connected electrically to the base of the cantilever by a conductive path 194. A voltage is applied between metal patch 192 and the substrate 196, causing cantilever 190 to bend towards the substrate. The voltage level is used to control the force between the tip of cantilever 190 and the surface of sample 196.

As indicated above, a second way of increasing the throughput of an AFM is to increase the scan rate of the cantilevers. The scan rate of an AFM is limited by the bandwidth of the actuator that is used to maintain a constant tip-sample force. Typically, the actuator consists of a large tube or stack of piezoelectric material that exhibits relatively low resonant frequencies (often less than 1 kHz). The error signal in the feedback system is used to drive the piezoelectric tube or stack so as to maintain the desired tip-sample separation and tracking force. The integral actuators shown in FIGS. 16, 17 and 18 have substantially higher resonant frequencies than the conventional tube or stack piezoelectric actuators; thus, using an array of cantilevers with separate integral actuators for each cantilever inherently allows the scanning rate to be significantly increased.

The minimal detectable deflection (MDD) of a cantilever is ultimately determined by noise levels. There are four principal types of noise to which the cantilever is subject: (i) fluctuations in the intensity of the incident light beam, (ii) shot noise in the light detectors, (iii) thermal mechanical noise, and (iv) "1/f" noise.

Variations in the intensity of the incident light beam can be canceled by detecting the difference between the zeroth and first order components of the diffraction pattern. Referring back to FIG. 5, the difference between the zeroth and first order components, represented by difference curve $P_0-P_1$, has a generally sinusoidal form with a maximum at x=0. If the equilibrium position of the cantilever is set at the steepest point of the sinusoidal curve (e.g., x≈900 Å) the differential power is roughly linear within a range of several hundred angstroms. Variations in the intensity of the incident light beam can also be canceled by dividing the intensity of one of the zeroth and first order components by the other.

The shot noise in the light detectors can be evaluated by comparison with the sensitivity of the cantilever (i.e., the amount of current generated by the photoconductive diode in the detectors per unit of tip displacement). The sensitivity S is given by:

$$S = \frac{PR\Delta P_n}{\Delta x} \quad (10)$$

where $\Delta P_n/\Delta x$ is the change in the normalized power per unit of tip displacement (e.g., the slope of the $P_0-P_1$ curve in FIG. 5), R is the responsivity of the photoconductive diode in the light detector, and P is the average power incident on the detector. The responsivity R is the amount of current produced in the photoconductive diode by a given amount of optical power.

$$R = \frac{I}{P} = \frac{Ne}{h_v} = \frac{n\lambda[\mu m]}{1.24} \quad (11)$$

where e is the charge of an electron, $\lambda$ is wavelength of the incident light, $h_v$ is the energy of a photon of the incident light, and N is the quantum efficiency (number of electron-hole pairs created per incident photon).

The MDD of the cantilever is found by dividing the shot noise $i_{rms}=\sqrt{2eRPB}$ by the sensitivity given in equation (10).

$$MDD = \frac{\sqrt{2eRPB}}{PR\frac{\Delta P_n}{\Delta x}}. \quad (12)$$

Equation (12) indicates that although the shot noise increases with the square root of P, the sensitivity is proportional to P. The MDD can therefore be improved by increasing the power of the incident light beam.

Illuminating the cantilever with a 1 mW light-emitting diode providing a wavelength of 670 nm yields an incident power P on the order of 0.1 mW. The quantum efficiency of a silicon detector for light having a wavelength of 670 nm is nearly 1, which gives a responsivity of 0.54 A/W. At the steepest portion of the $[P_0-P_1]$ curve in FIG. 5, $\Delta P_n/\Delta x$ is roughly 4.4 ×10$^{-4}$ Å$^{-1}$, which yields a sensitivity of 24 nA/Å. The MDD of the detection system is approximately 0.01 Å.

Modeling the cantilever as a harmonic oscillator with a spring constant k and a quality factor Q, the thermal mechanical noise well below the resonant frequency $\omega_o$ is:

$$Z_{rms} = \sqrt{\frac{4k_bTB}{Qk\omega_o}} \quad (13)$$

Assuming Q=100, $\omega_o$=2π30 kHz, and k=0.1 N/m, the thermal mechanical noise is roughly 0.01 Å in a 1 kHz bandwidth. This is comparable to the level of the shot noise in the light detector and confirms that an MDD of 0.01 Å is achievable.

When an AFM is operating in the contact mode, the deflection of the cantilever is typically measured continuously (DC). Measuring the deflection periodically (AC) at a frequency $\omega_o$ hifts the detection bandwidth to a frequency range centered on $\omega_o$. Provided that $\omega_o$ is sufficiently large, this avoids the noise contribution from certain 1/f noise sources. The resolution and MDD of the AFM are then limited by white noise sources such as Johnson or shot noise.

Figure 21:
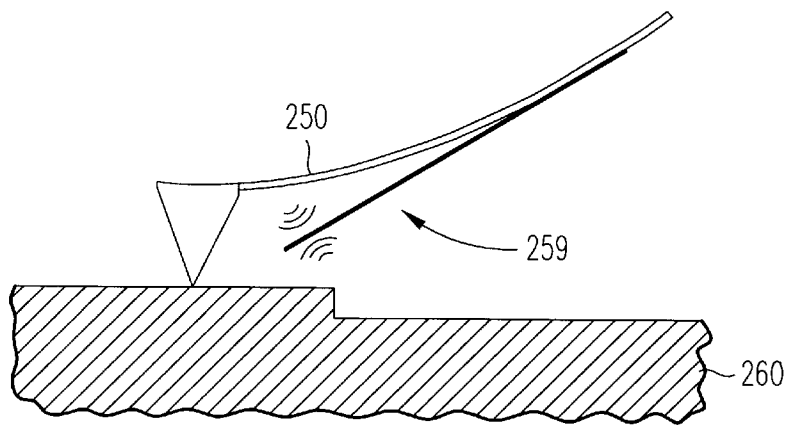
FIG. 21 is a side view of cantilever 250 of FIG. 20 placed in contact with a substrate 260.
Figure 20:
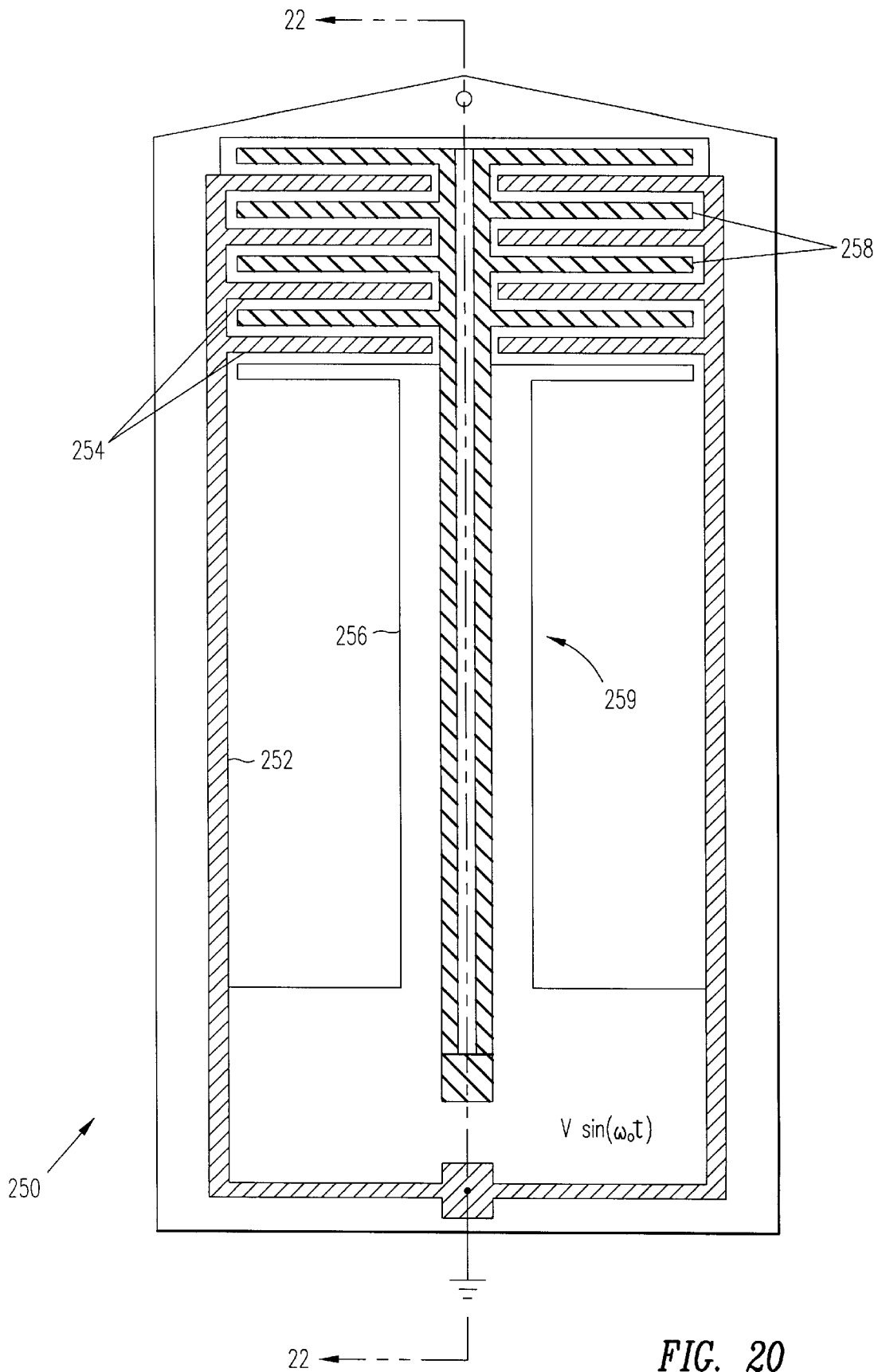
FIG. 20 illustrates a cantilever 250 that may be used in an AC mode of cantilever deflection detection.

An AC mode of deflection detection in an interdigital cantilever can be realized by fabricating the cantilever as shown in FIG. 20. Cantilever 250 includes an array of interdigitated fingers that are perpendicular to the main axis of the cantilever. A conductive metal layer 252 is deposited by evaporation on the movable fingers 254 and is connected to ground. A conductive metal layer 256 is deposited by evaporation on the reference fingers 258 and is connected to an AC signal operating at a frequency $\omega_o$. As shown in the side view of FIG. 21, cantilever 250 is placed in contact with the substrate 260, and $\omega_o$, the frequency of the AC signal, is established such that reference fingers 258 and their supporting structure 259 are driven by electrostatic forces to oscillate at their resonant frequency. This is possible because the mechanical coupling between movable fingers 254 and reference fingers 258 is weak.

The amplitude of the oscillations of reference fingers 258 is measured by the optical techniques described above. When movable fingers 254 are deflected by a feature of substrate 260, the strength of the electrostatic driving force between movable fingers 254 and reference fingers 258 changes, and this in turn causes the amplitude of the oscillations to change. In other words, if the tip of cantilever 250 is deflected by a distance $\Delta x$, the amplitude will change by an amount $\Delta A$, where $\Delta A=G\Delta x$ with G being the gain. G depends on the geometry and relative position of the movable and reference fingers, the amplitude of the AC signal applied to reference fingers 258, and the quality factor and spring constant of cantilever 250. If G>1, the overall SNR of the system is increased; if G<1, the sensitivity is reduced. Setting $\omega_o$ at several tens of kHz is effective in reducing the 1/f noise. FIGS. 22A–22I illustrate the steps of a process that can be used to fabricate cantilever 250 of FIG. 20, although it will be appreciated that many of the steps illustrated in FIGS. 22A–22I are also applicable to processes for fabricating cantilevers 10 and 20 shown in FIGS. 1A, 1B and 2. FIGS. 22A–22I are taken at cross-section 22—22 of FIG. 20.

Figure 22A:
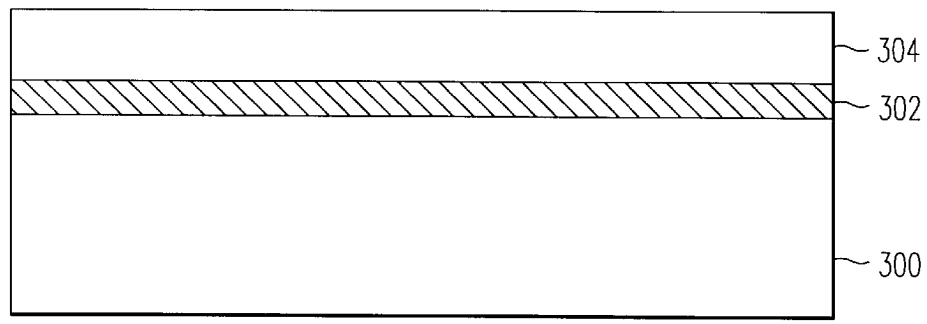
FIGS. 22A–22I illustrate the steps of a process that can be used to fabricate cantilever 250 of FIG. 20.

The process begins with the silicon-on-insulator (SOI) <100> wafer shown in FIG. 22A, which includes a bottom silicon layer 300 (450 µm thick), a middle oxide layer 302 (1 µm thick) and a top silicon layer 304 (10 µm thick). To gain maximum advantage from the electrostatic actuator (FIGS. 20 and 21), the initial height of the cantilever is selected to be spaced 1 µm to 3 µm from the sample. This dictates making the tip as long as possible. Since the cantilever and tip will be formed from the top silicon layer 304, a 10 μm thick layer allows for a tip length in the range of 6–8 μm.

Figure 22B:
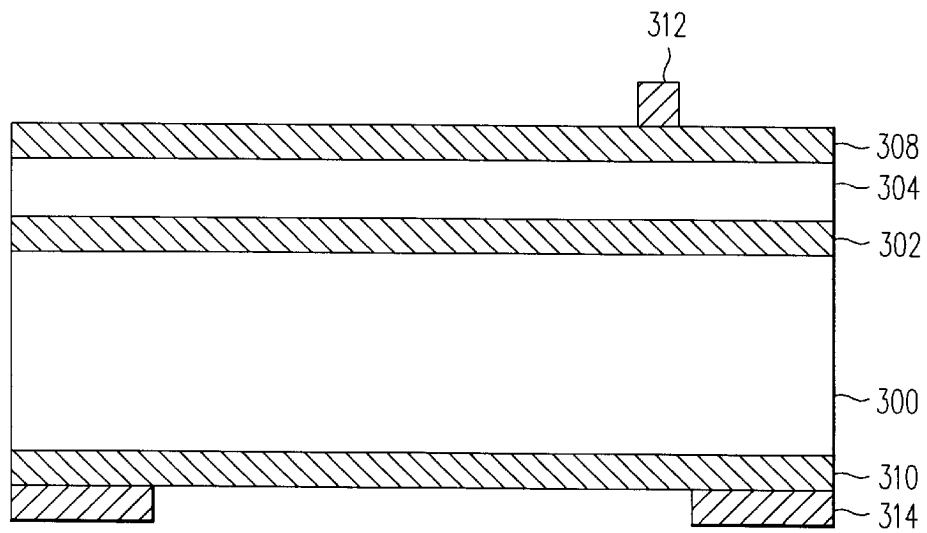

As shown in FIG. 22B, oxide layers 308 and 310 are formed on the surfaces of top silicon layer 304 and bottom silicon layer 300, respectively, by wet oxidation at 1100° C. for 2 hrs 25 mins. This yields layers 1 μm thick. Oxide layer 308 is masked with a photoresist layer (where the tip is to be formed), and oxide layer 310 is masked with a photoresist layer 314.

Figure 22C:
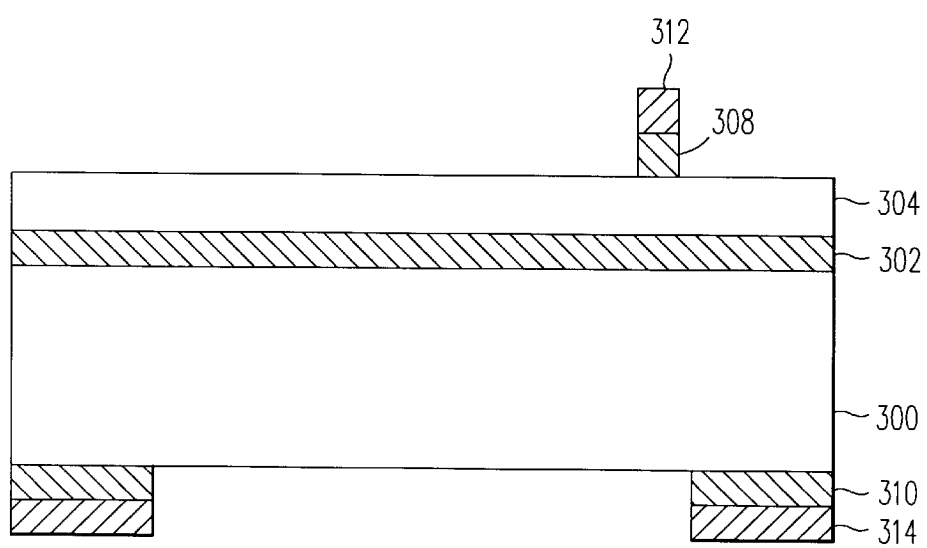

As shown in FIG. 22C, oxide layers 308 and 310 are etched in BOE for 10 mins, exposing a portion of the surfaces of silicon layers 300 and 304.

Figure 22D:
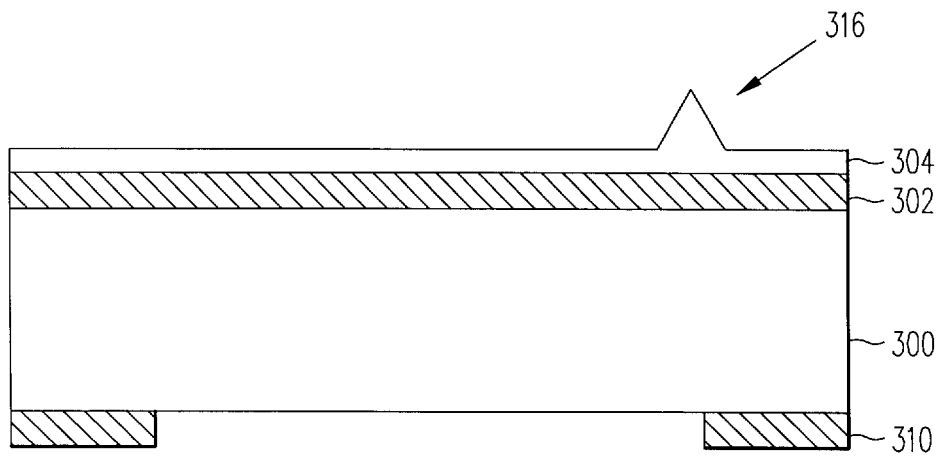

The tip of the cantilever is then formed by etching partially through silicon layer 304 using photoresist layer 312 and the remaining portion of oxide layer 308 as a mask. The tip is preferably sharpened by thermally oxidizing the surface of the tip repeatedly and then removing the oxide. Since the silicon oxidizes slower at the convex corners than along flat surfaces, the end result of this process is a sharpened tip with a radius of about 100 Å. The thermal oxidation step also grows an oxide layer (not shown) on the bottom silicon layer 300. The oxide layer is removed. The end result of this step, including a tip 316, is shown in FIG. 22D. The remaining thickness of top silicon layer 304 essentially determines the thickness of the cantilever.

Figure 22E:
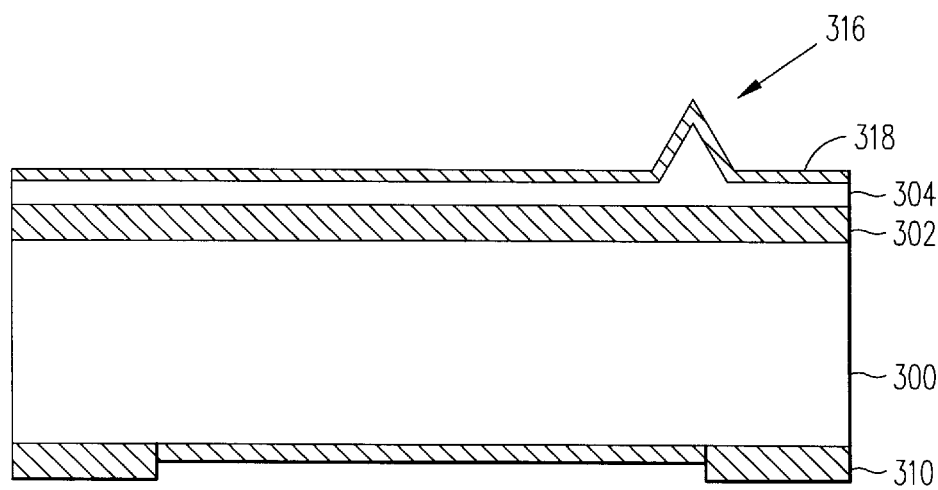

As shown in FIG. 22E, after tip 316 is formed and sharpened, an oxide layer 318 is grown on top of silicon layer 304 to provide insulation for subsequent metal layers that are used for electrostatic actuation. To reduce the effects of thermal stress, oxide layer 318 is preferably created with spin-on-gas (SOG). A corresponding oxide layer that forms on the bottom silicon layer 300 is removed.

Figure 22F:
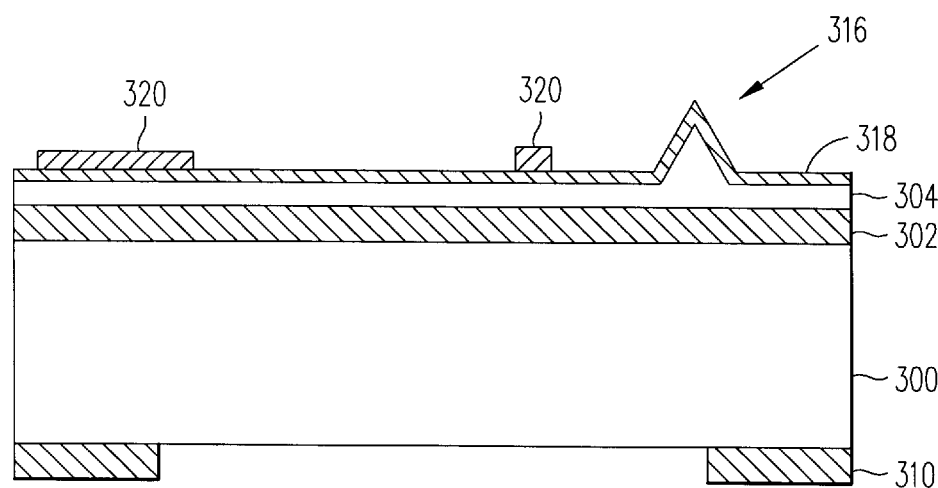

As shown in FIG. 22F, an aluminum layer 320 is deposited by evaporation, masked by photolithographic techniques, and etched (using conventional processes) to form the metal conductive lines for movable fingers 254 and the reference fingers 258 (see FIG. 20).

Figure 22G:
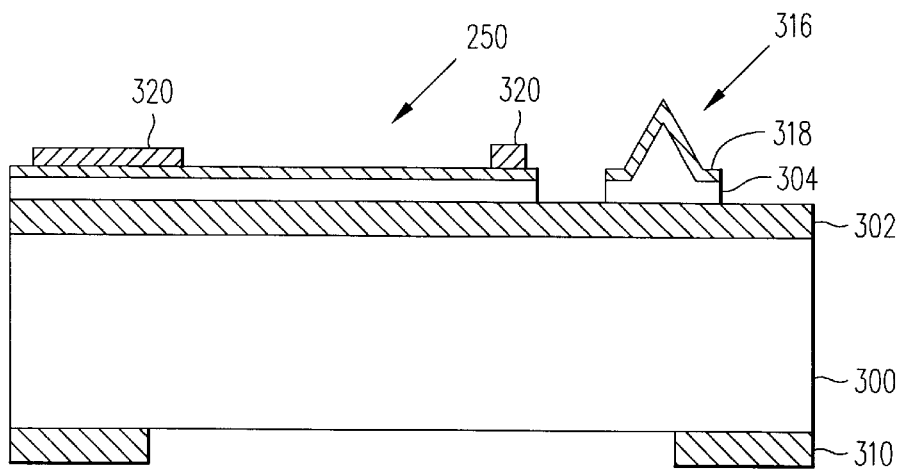

As shown in FIG. 22G, cantilever 250 is formed by masking and etching oxide layer 318 and top silicon layer 304. The mask is created by depositing, developing and patterning a layer of photoresist in the shape desired for cantilever 250, including the movable fingers 254 and the reference fingers 258. Using conventional processes, oxide layer 318 is etched in an HF solution, and silicon layer 304 is dry-etched down to the middle oxide layer 302, which serves as an etch-stop.

Figure 22H:
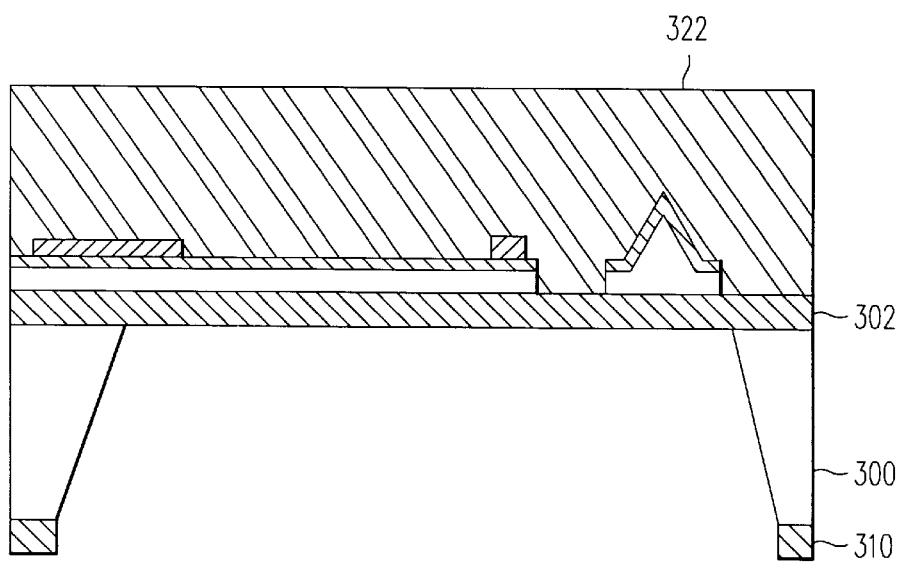

As shown in FIG. 22H, the features of cantilever 250 are protected by covering them with a thick layer 322 of polyimide. This can be done by spinning on PIQ polyimide for 2 min at 500 RPM and then baking the polyimide layer at 350° C. for 2 hrs. The exposed portion of bottom silicon layer 300 is etched from the backside using an EDP etch at 105° C. Other etchants, such as KOH or TMAH, can also be used. Middle oxide layer 302 serves as an etch-stop.

Figure 22I:
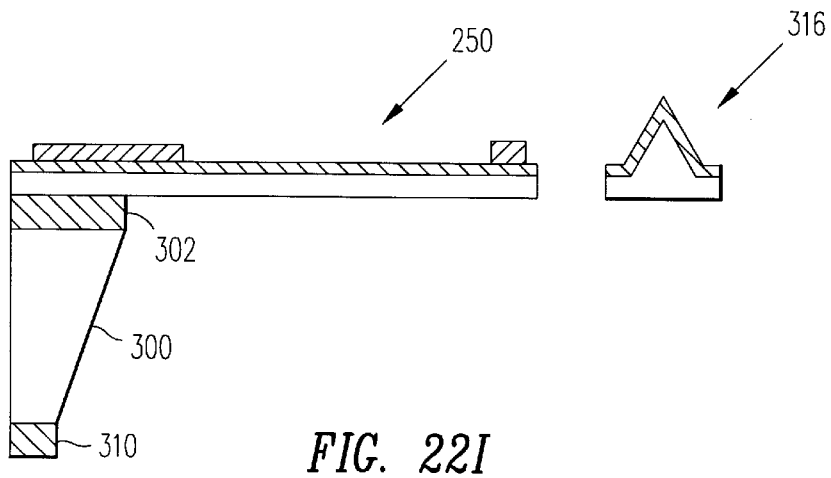

Finally, as shown in FIG. 22I, the exposed portion of middle oxide layer 302 is removed with a 6:1 BOE etch and polyimide layer 322 is stripped in an $O_2$ plasma, thereby completing the fabrication of cantilever 250.

An alternative to using an SOI wafer is to use a silicon wafer implanted with a B+ to form a submerged layer which acts as an etch-stop. However, the rounded profile of the B+ submerged layer could make difficult the formation of a thin (1–4 μm thick) cantilever with sharp, interdigitated fingers.

To increase the sensitivity of interdigital cantilevers for small tip displacements, cantilevers can be biased so that the zero position of the movable fingers is the position of maximum sensitivity. Such biasing may be accomplished mechanically by fabricating the cantilever with the movable fingers vertically offset from the reference fingers, or electrically by moving one set of the fingers with an actuator after the cantilever is fabricated. Alternatively, a combination of mechanical and electrical biasing may be used.

Figure 23:
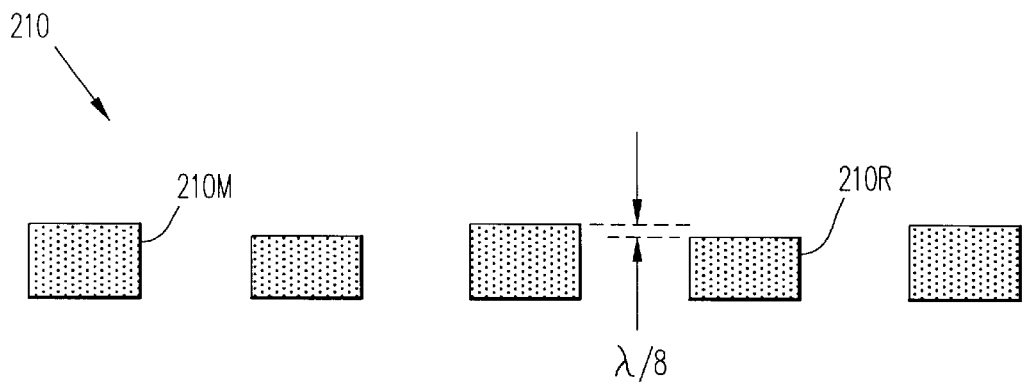
FIG. 23 is a cross-sectional view of a cantilever 210 that is similar to cantilever 10 of FIG. 3, except that the reference fingers 210R are thinner than the movable fingers 210M by an amount equal to one-eighth of the wavelength of the incident light (i.e., $\lambda/8$).

FIG. 23 is a cross-sectional view of a cantilever 210 that is similar to cantilever 10 of FIG. 3, except that the reference fingers 210R are thinner than the movable fingers 210M by an amount equal to one-eighth of the wavelength of the incident light (i.e., λ/8). The difference in thickness between reference and movable fingers may also be integer multiples of λ/8. In this case, equation (2), giving the intensity I as a function of the tip displacement x, becomes $$I=\sin^2(2\pi x/\lambda+\pi/4) \qquad (9)$$

ensuring maximum sensitivity around the equilibrium position.

Figure 24:
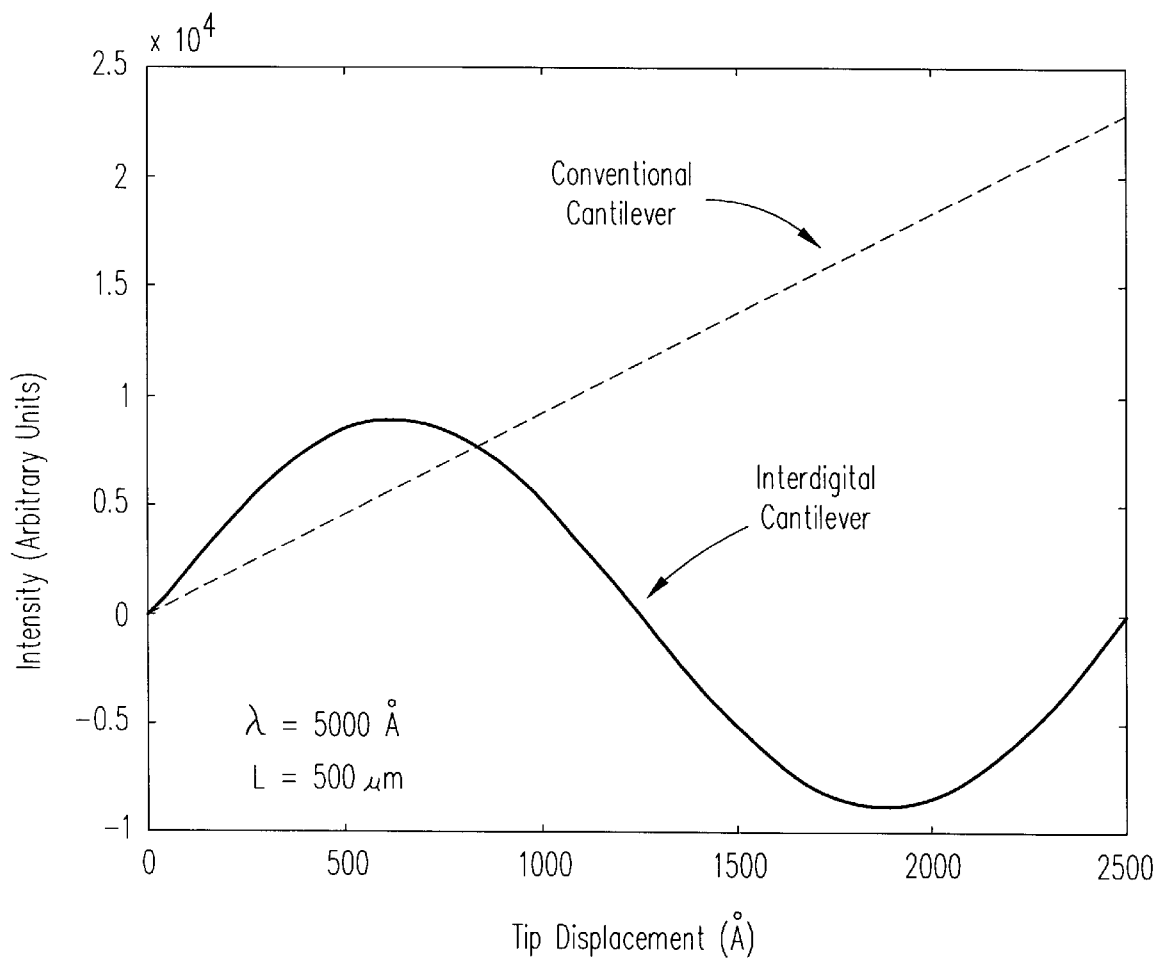
FIG. 24 is a graph of reflected intensity as a function of the tip displacement.

FIG. 24 is a graph of reflected intensity as a function of the tip displacement. Comparing FIG. 24 to FIG. 8 indicates that the intensity provided by the interdigital cantilever 210 of FIG. 23 is greater than the intensity provided by a conventional cantilever at tip displacements up to approximately 800 Å.

Figure 25:
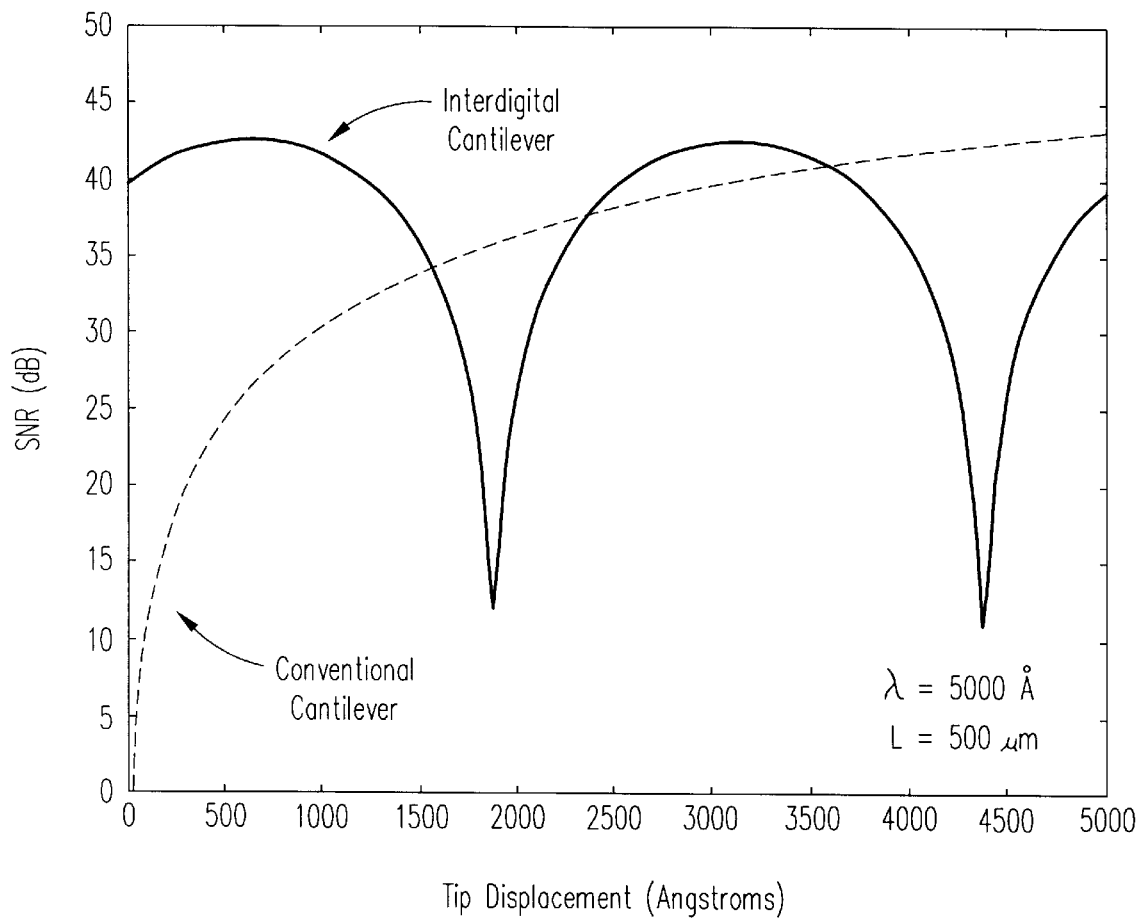
FIG. 25 shows the SNR for cantilever 210 as a function of the tip displacement.

FIG. 25 shows the SNR for cantilever 210 as a function of the tip displacement. Comparing FIG. 25 with FIG. 9 indicates that the SNR of the interdigital cantilever 210 at small tip displacements is significantly improved over that of cantilever 10.

FIGS. 26A–26E illustrate steps in a process of fabricating a mechanically biased cantilever. The described process is similar to the conventional silicon-nitride cantilever process described by Albrecht in U.S. Pat. No. 5,221,415; however, an additional silicon etch creates a vertical spacing (i.e., a mechanical bias) between the reference and movable fingers. The depth of the additional silicon etch determines the bias.

Figure 26A:
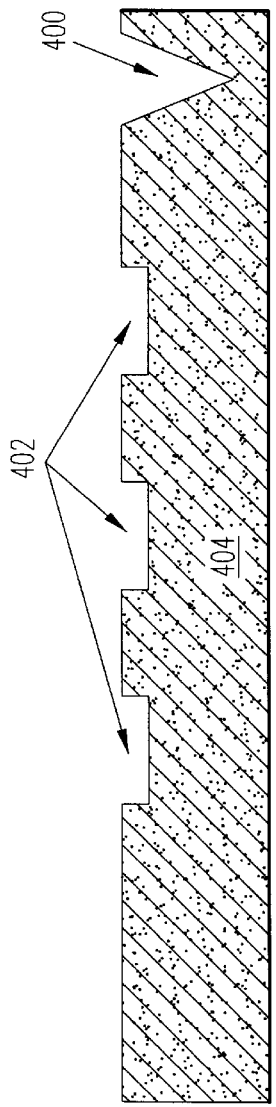

In FIG. 26A, a pyramidal pit 400 and channels 402 are formed in a Si <100> wafer 404 using anisotropic etching. Pyramidal pit 400 should be formed before channels 402, for the depth of channels 402 determines the degree of biasing.

Figure 26B:
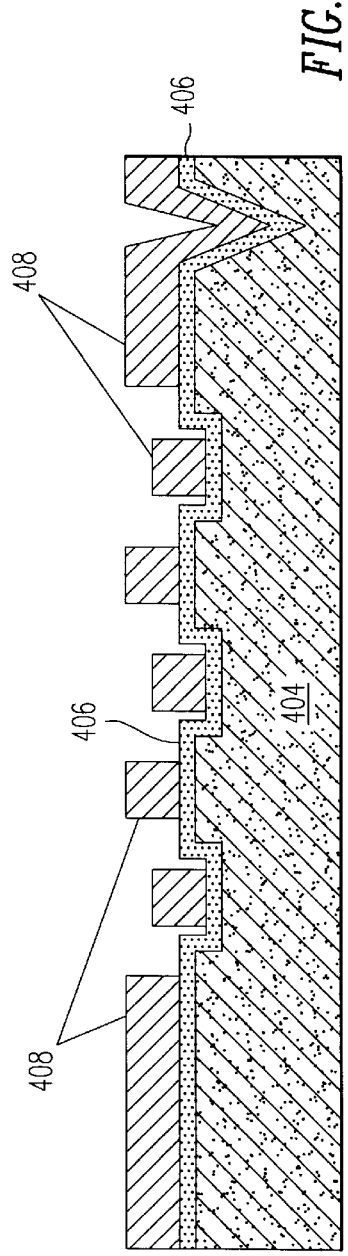
Figure 26C:
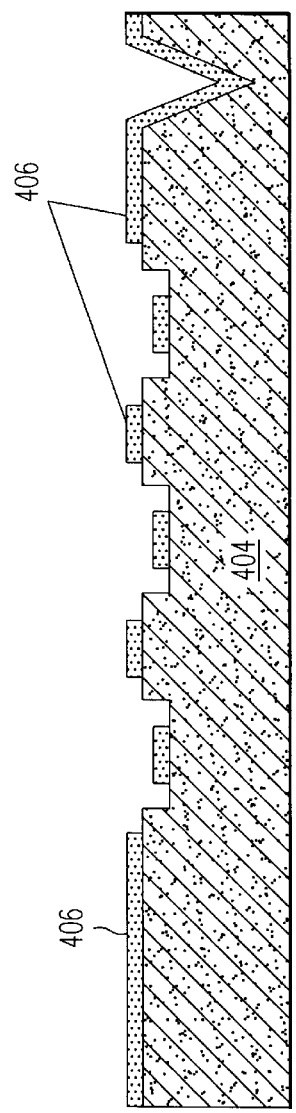

Next, as shown in FIG. 26B, a $Si_3N_4$ layer 406 is conventionally deposited over the surface of wafer 404. A layer of photoresist 408 is then conventionally deposited and patterned to define the desired cantilever shape. The exposed $Si_3N_4$ is then conventionally removed and the photoresist stripped, leaving $Si_3N_4$ patterned into the desired cantilever shape (FIG. 26C).

In FIG. 26D, the patterned $Si_3N_4$ is annealed and glass 410 is anodically bonded to a surface of the patterned $Si_3N_4$. Finally, to obtain the mechanically biased cantilever of FIG. 26E, the silicon of wafer 404 is etched away, using conventional techniques, thereby freeing the cantilever.

Another method of mechanically biasing cantilevers relies on the inherent stress of oxidation processes to bend either the movable or the reference fingers. This type of biasing may be accomplished by first growing a thin layer of thermal oxide on the entire cantilever after the oxidation sharpening of tip 316. The oxide is then removed from only one set of the fingers (either the movable or the reference fingers) by conventional photolithographic processes. The residual stress created by the formation of the oxide causes the oxidized set of fingers to deflect. The thickness of the oxide and the temperature of the oxide process is experimentally determined for a given cantilever; however, because oxidation is a relatively uniform and reliable process, once an appropriate thickness is determined the oxide process provides repeatable cantilever offsets.

Figure 27A:
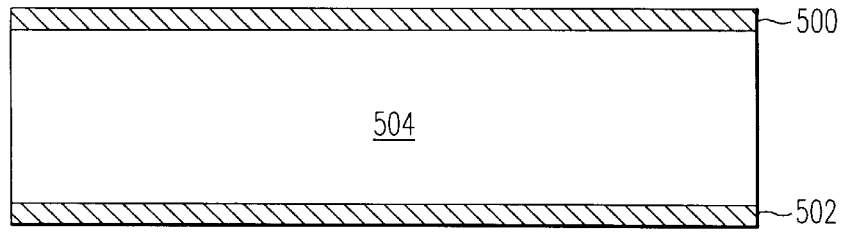
FIGS. 27A–27E illustrate another method of biasing cantilevers in accordance with the present invention.
Figure 27B:
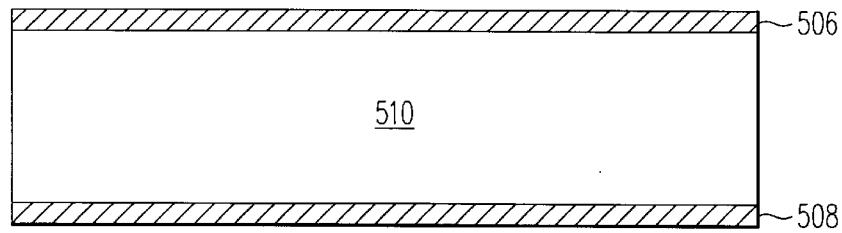
Figure 27C:
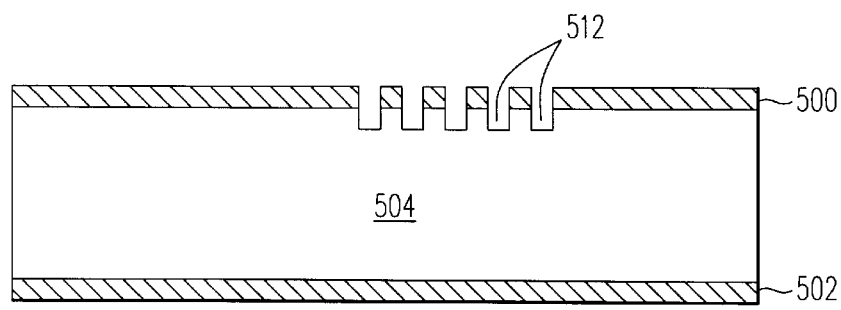

Yet another method of biasing cantilevers is illustrated in FIGS. 27A–27E. As shown in FIG. 27A, oxide layers 500 and 502 are grown on opposite sides of a silicon wafer 504 using conventional oxidation techniques. Oxide layers 506 and 508 are similarly grown on a second silicon wafer 510 (FIG. 27B).

Figure 27D:
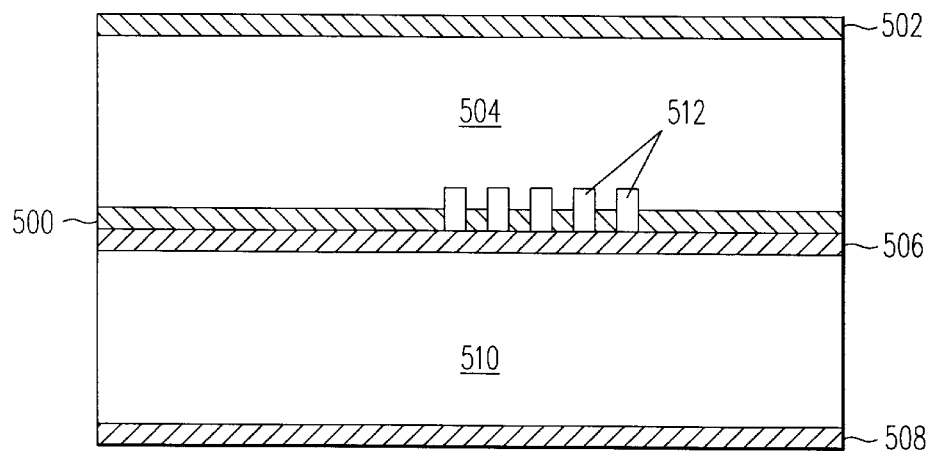

Alignment marks (not shown), are then patterned onto oxide layer 500. The biasing pattern of the movable and reference fingers is then aligned to the alignment marks and etched into silicon wafer 504 to form channels 512. Channels 512 are etched to a depth that equals an integer multiple of one-eighth of the wavelength of the incident light ($\lambda/8$) that will be used to sense cantilever displacement. Once etched, wafers 504 and 510 are silicon-fusion bonded to one another via oxide layers 500 and 506 (FIG. 27D). Before oxide layers 500 and 506 are brought into contact, wafers 504 and 510 are cleaned and oxide layers 500 and 506 are hydrolyzed. The silicon-fusionbonding may be performed in a wet oxidation furnace for two hours at about 1,000° C. This conventional bonding process is described in Christine Harendt et al., "Wafer Bonding: Investigation and in Situ Observation of the Bond Process," *Sensors and Actuators*, A21–A23 (1990) pp. 927–930, which is incorporated herein by reference.

Figure 27E:
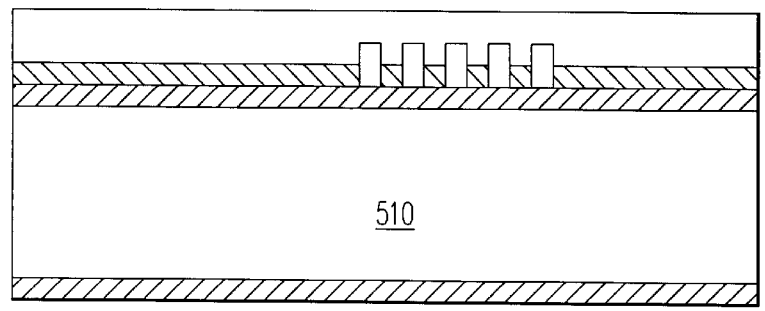

After bonding, wafer 504 is thinned and polished to 10 m (FIG. 27E). The fabrication sequence then follows a process similar to that described above in connection with FIGS. 22B–22I. However, a phase grating is created by patterning the movable fingers and the reference fingers such that they are offset from one another by the depth of channels 512. For example, the movable fingers may be patterned and formed over channels 512 so that when the bottom surface of the cantilever is exposed by the removal of a portion of wafer 510 the bottom surfaces of the movable fingers are recessed.

Figure 28A:
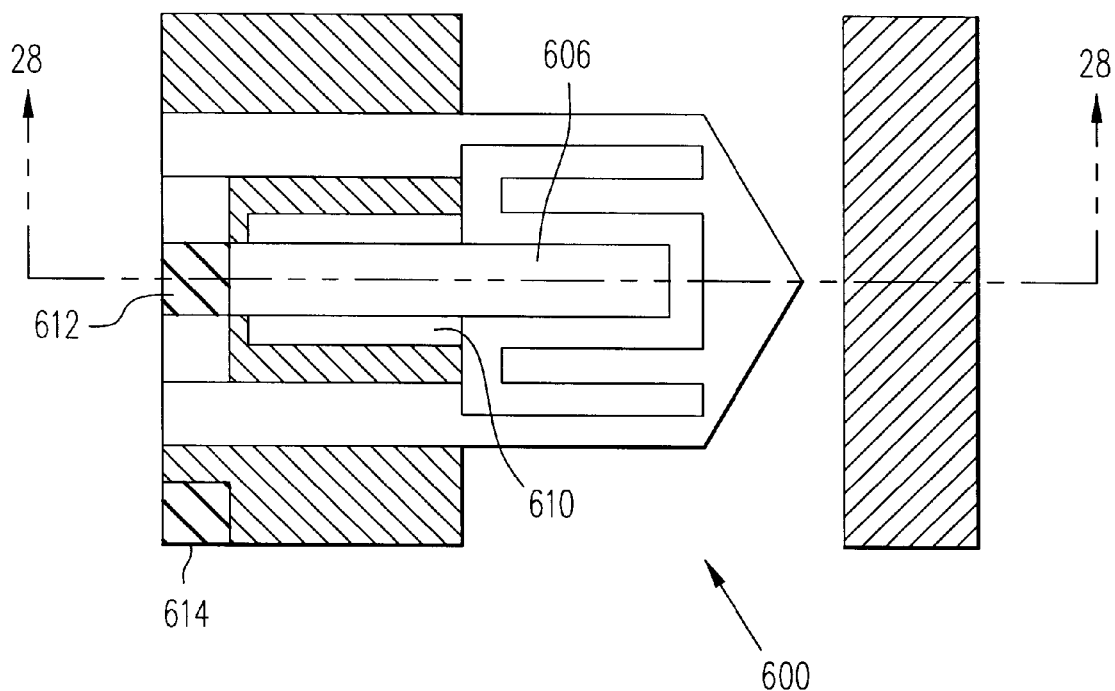
FIG. 28A is a plan view of a cantilever 600, which includes an electrostatic actuator 610 for electronically biasing cantilever 600.
Figure 28B:
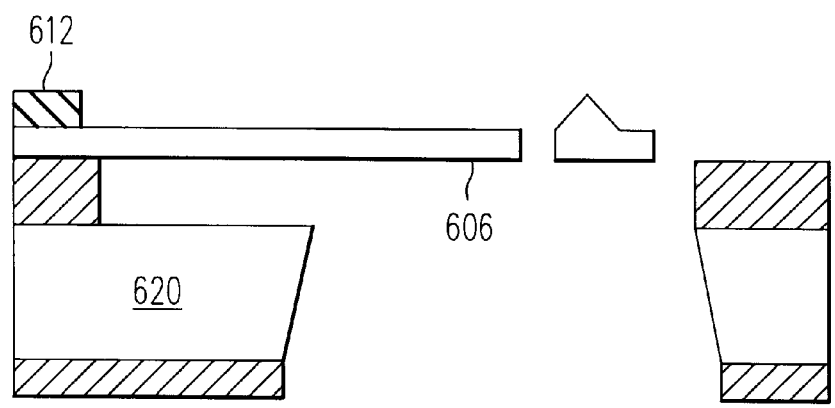
FIG. 28B is a plan view of the cantilever 600 at cross-section 28—28 shown in FIG. 28A.

FIG. 28A shows a plan view of a cantilever 600 that may be biased electrically. Cantilever 600 includes a movable element 604, a conductive reference element 606, and a conductive patch 610 disposed beneath reference element 606. Electrical contact is made to reference element 606 via a metal contact 612 and to patch 610 via a second metal contact 614. FIG. 28B is a view of the cantilever 600 at cross-section 28—28 of FIG. 28A.

A voltage applied between metal contacts 612 and 614 creates an electrostatic attraction between patch 610 and reference element 606. This attraction bends reference element 606 toward conductive patch 610. Thus, the vertical displacement of reference element 660 may be adjusted to provide a desired vertical offset between movable member 604 and reference element 660 to bias cantilever 600.

The fabrication sequence for cantilever 600 is similar to that described above in connection with FIGS. 22A–22I. However, conductive patch 610 must be made conductive by, for example, an additional implant step or by fabricating cantilever 600 using a conductive silicon wafer 620.

In another embodiment, the electrostatic actuator of cantilever 600 is replaced with a piezoelectric actuator.

Figure 29:
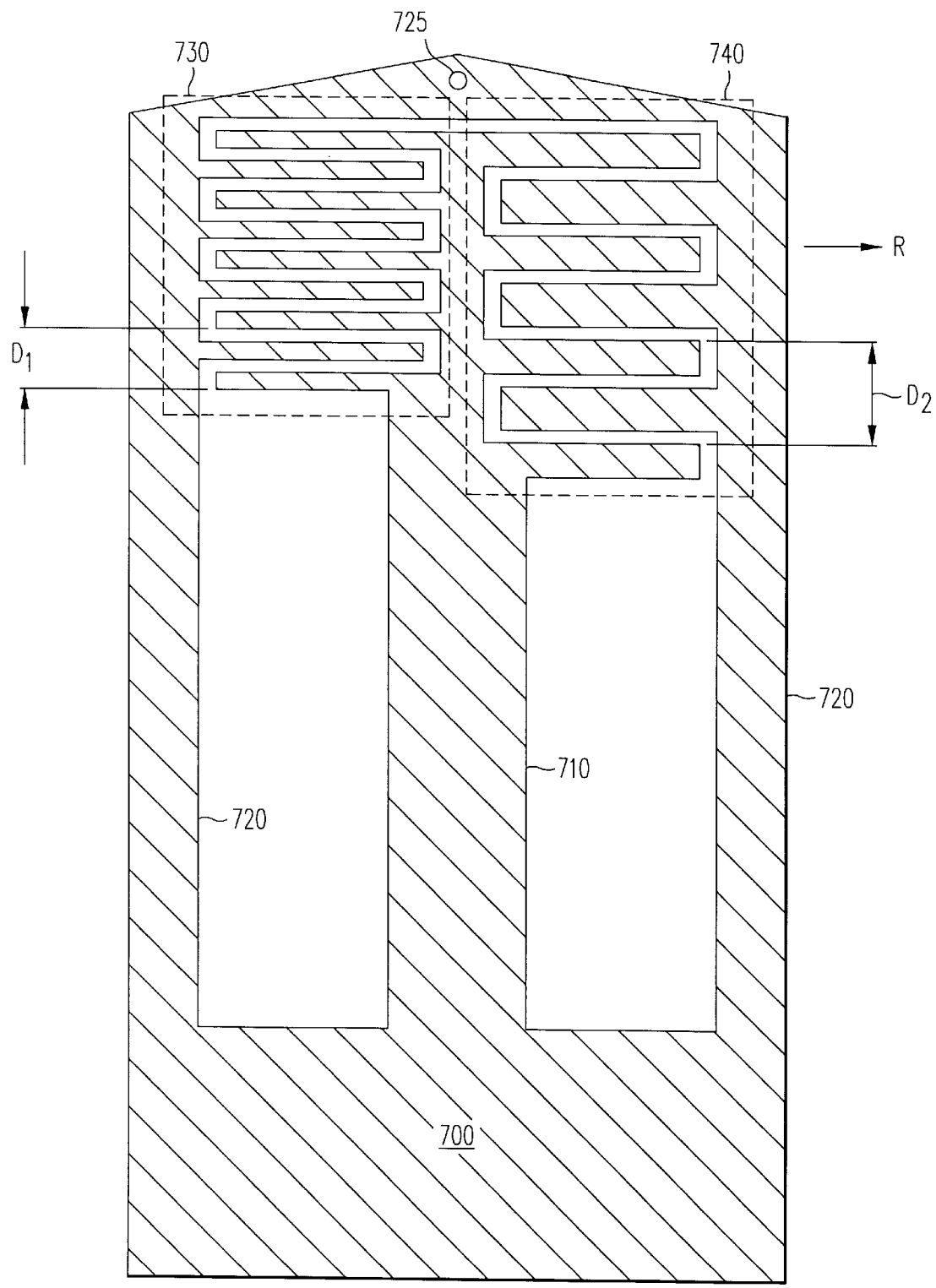
FIG. 29 is a plan view of a cantilever 700 that may be used for lateral force microscopy.

FIG. 29 shows a plan view of a cantilever 700 that may be used in the field of lateral force microscopy, in which a cantilever is typically scanned along a surface to be imaged in a direction perpendicular to the length of the cantilever. For more information regarding lateral force microscopy, see C. Mathew Mate et al., "Atomic-scale Friction of a Tungsten Tip on a Graphite Surface," Physical Review Letters (American Physical Society), 1987, pp. 1942–1945, which is incorporated herein by reference.

The fabrication sequence for cantilever 700 is similar to that described above in connection with FIGS. 22A–22I. Cantilever 700 includes a reference element 710, a movable element 720, and a tip 725 disposed on the movable element 720. In operation, cantilever 700 is scanned over a surface in the direction indicated by arrow "R." As cantilever 700 moves over the surface, interaction between the surface and tip 725 causes movable element 720 to be twisted and vertically displaced.

Each of elements 710 and 720 includes fingers that are interdigitated to form a first phase grating 730 and a second phase grating 740. The fingers forming first phase grating 730 have a grating period $D_1$ that is less than the grating period $D_2$ of the fingers of phase grating 740. As a result of the difference in grating periods $D_1$ and $D_2$, the angles between the respective first order components and zeroth order components of phase gratings 730 and 740 differ (See equation 1). Thus, each of phase gratings 730 and 740 provides unique diffraction patterns that may be used to separately determine the displacement of each side of moveable element 720. Furthermore, comparing the relative displacements of phase gratings 730 and 740 indicates both the vertical and the torsional displacements of element 720.

The foregoing description is illustrative and not limiting. Many alternative embodiments within the broad principles of this invention will be apparent to those skilled in the art. For example, while the cantilevers described above are for AFMs, the invention is also applicable to other technologies that utilize microcantilever displacement to detect a variety of chemical and physical properties and events. For example, microcantilever displacement has been used to:

1. determine the static and dynamic properties of thin films;
2. measure stress, Young's modulus, and fatigue properties of materials;
3. measure temperature and humidity;
4. sense for the presence and concentration of various chemicals, such as mercury vapor;
5. study phase transition and heat capacity;
6. detect radiation;
7. measure the absorption spectrum of materials via photothermal heating;
8. measure quantitative values of the magnetization, magnetic structure, and intrinsic stress of magnetic films; and
9. investigate electron-spin resonance and nuclear magnetic resonance.

The present invention may be used to measure cantilever deflection to achieve each of the above-enumerated ends. Thus, the present invention, as defined by the following claims, is intended to cover all such embodiments.

We claim:

1. A combination comprising:
   a cantilever extending from a support and having a free end comprising a tip, said cantilever comprising a phase grating, said phase grating comprising:
   a first element having a first surface, the first surface configured to reflect a first portion of a beam of electromagnetic radiation; and
   a second element adjacent the first element and having a second surface configured to reflect a second portion of the beam, said first and second elements being separated by a gap wherein relative motion between said first and second elements occurs as a force against said tip varies;
   a source of electromagnetic radiation configured to direct the beam onto the phase grating; and a photodetector configured to receive a part of the beam reflected by the phase grating.

2. The combination of claim 1, wherein the second element is coupled to said support and the first element is coupled to said tip.

3. The combination of claim 1, further comprising an actuator connected to the first element.

4. The combination of claim 3, wherein the actuator is connected to the second element.

5. The combination of claim 1, wherein the first surface is offset from the second surface by a bias distance.

6. The combination of claim 5, wherein the beam has a wavelength $\lambda$, and wherein the bias distance is a multiple of one-eighth the wavelength $\lambda$.

7. The combination of claim 5, further comprising an actuator connected to the first element, the actuator configured to induce the bias distance.

8. The combination of claim 1, wherein the first and second surfaces are specular.

9. The combination of claim 1, wherein the electromagnetic radiation is light having a wavelength of less than 0.5 microns.

10. The combination of claim 1, wherein
the second element is positioned adjacent the first element such that the reflected first and second portions interfere with one another to create a diffraction pattern.

11. The combination of claim 10, wherein the diffraction pattern includes a zero-order component and a plurality of higher-order components, and wherein the portion of the beam reflected by the phase grating is at least one of the components.

12. The combination of claim 1 wherein said combination comprises an atomic force microscope.

13. A combination comprising:
a cantilever having a phase grating and comprising a support, said phase grating comprising:
a first element extending from the support and having a first surface, the first surface configured to reflect a first portion of a beam of electromagnetic radiation; and
a second element adjacent the first element and having a second surface configured to reflect a second portion of the beam, wherein the first element includes a first plurality of fingers and the second element includes a second plurality of fingers interdigitated with the first plurality of fingers;
a source of electromagnetic radiation configured to direct the beam onto the phase grating; and
a photodetector configured to receive a part of the beam reflected by the phase grating.

14. The combination of claim 13, wherein the cantilever has a length and a width, and wherein the first and second pluralities of fingers are perpendicular to the length of the cantilever.

15. The combination of claim 13, wherein the cantilever has a length and a width, and wherein the first and second pluralities of fingers are parallel to the length of the cantilever.

16. The combination of claim 13 wherein said combination comprises an atomic force microscope.

17. The combination of claim 13 wherein said combination further comprises:
a one dimensional array of cantilevers, the one dimensional array of cantilevers comprising said cantilever and a second cantilever, the second cantilever having a second phase grating and comprising a second support, the second phase grating comprising:
a third element extending from the second support and having a third surface, the third surface configured to reflect a third portion of the beam of electromagnetic radiation; and
a fourth element adjacent the third element and having a fourth surface, the fourth surface configured to reflect a fourth portion of the beam, wherein the third element includes a third plurality of fingers and the fourth element includes a fourth plurality of fingers interdigitated with the third plurality of fingers; and
a second photodetector configured to receive a second part of the beam reflected by the second phase grating.

18. The combination of claim 17, where the combination comprises a two dimensional array of cantilevers.

19. The combination of claim 17, wherein the first cantilever has a length and a width, and wherein the first plurality of fingers and the second plurality of fingers are perpendicular to the length of the first cantilever.

20. The combination of claim 19, wherein the second cantilever has a length and a width, and wherein the third plurality of fingers and the fourth plurality of fingers are perpendicular to the length of the second cantilever.

21. The combination of claim 17, wherein the first cantilever has a length and a width, and wherein the first plurality of fingers and the second plurality of fingers are parallel to the length of the first cantilever.

22. The combination of claim 21, wherein the second cantilever has a length and a width, and wherein the third plurality of fingers and the fourth plurality of fingers are perpendicular to the length of the second cantilever.

23. A combination comprising:
a cantilever having a phase grating and comprising a support, the phase grating comprising:
a first element extending from the support and having a first surface, the first surface configured to reflect a first portion of a beam of electromagnetic radiation; and
a second element adjacent the first element and having a second surface configured to reflect a second portion of the beam wherein the second element is a reference element and the first element is a movable element that includes a tip of the cantilever;
a source of electromagnetic radiation configured to direct a beam onto the phase grating; and
a photodetector configured to receive a part of the beam reflected by the phase grating, wherein the phase grating has a first grating period, the cantilever further comprising:
a second phase grating having a second grating period.

24. The combination of claim 23, wherein the first grating period is different from the second grating period.

25. The combination of claim 24, wherein the first and second phase gratings are for measuring torsional displacement of the movable element.

26. The combination of claim 23 wherein said combination comprises an atomic force microscope.

* * * * *